(12) United States Patent
Wakisaka et al.

(10) Patent No.: US 12,313,449 B2
(45) Date of Patent: May 27, 2025

(54) OPTICAL PULSE TEST METHOD AND OPTICAL PULSE TEST EQUIPMENT

(71) Applicant: NIPPON TELEGRAPH AND TELEPHONE CORPORATION, Tokyo (JP)

(72) Inventors: Yoshifumi Wakisaka, Musashino (JP); Daisuke Iida, Musashino (JP); Hiroyuki Oshida, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 473 days.

(21) Appl. No.: 17/766,494

(22) PCT Filed: Oct. 17, 2019

(86) PCT No.: PCT/JP2019/040821
§ 371 (c)(1),
(2) Date: Apr. 4, 2022

(87) PCT Pub. No.: WO2021/075015
PCT Pub. Date: Apr. 22, 2021

(65) Prior Publication Data
US 2023/0175884 A1     Jun. 8, 2023

(51) Int. Cl.
*G01H 9/00*     (2006.01)
(52) U.S. Cl.
CPC .................. *G01H 9/004* (2013.01)
(58) Field of Classification Search
CPC ....................................... G01H 9/004

USPC ......................................................... 73/655
See application file for complete search history.

(56) References Cited

U.S. PATENT DOCUMENTS

2017/0248480 A1\*    8/2017  Dong ................. G01D 5/35316

OTHER PUBLICATIONS

A. Masoudi, T. P. Newson, "Contributed Review: Distributed optical fibre dynamic strain sensing", Review of Scientific Instruments, vol. 87, p. 011501 (2016).

Ken'ichi Nishiguchi, Li Che-Hsien, Artur Guzik, Mitsunori Yokoyama, Kinzo Masuda, "Fabrication of Fiber-Optic Distributed Acoustic Sensor and Its Signal Processing", IEICE Tech. Rep., vol. 115 (202), pp. 29-34 (2015).

(Continued)

*Primary Examiner* — Walter L Lindsay, Jr.
*Assistant Examiner* — Philip T Fadul
(74) *Attorney, Agent, or Firm* — Harness, Dickey & Pierce, P.L.C.

(57) ABSTRACT

An object of the present invention is to propose a design method of a minimum value N of the number of multiplexed frequencies that is necessary for measuring an object vibrational frequency according to DAS-P while taking into consideration a trade-off between a measurement distance and an upper limit of a measurable vibrational frequency. When a phase change of an arbitrary section of a measured optical fiber is represented by $A\times\sin(2\pi fvt)$, $N=4Zfv/v$ is satisfied when A is smaller than $\pi/2$ but $N=2Zfv/(v\cdot\text{Arcsin}(\pi/2A))$ is satisfied when A is equal to or larger than $\pi/2$, where fv represents vibrational frequency, t represents time, Z represents a length of the measured optical fiber (a measurement distance), and v represents the speed of light inside the measured optical fiber.

12 Claims, 22 Drawing Sheets

(56) References Cited

OTHER PUBLICATIONS

G. Yang et al., "Long-Range Distributed Vibration Sensing Based on Phase Extraction from Phase-Sensitive OTDR", IEEE Photonics Journal, vol. 8, No. 3, 2016.
Yoshifumi Wakisaka, Daisuke Iida, Keiji Okamoto, Hiroyuki Oshida, "Shuuhasuu tajuuisou OTDR wo mochiita bunpushindoukeisokuhouhou (Distributed Vibration Sensing Method with Frequency-Multiplexed Phase-OTDR)", 2019 IEICE Society Conference, Aug. 27, 2019.
D. Iida, K. Toge, T. Manabe, "Distributed measurement of acoustic vibration location with frequency multiplexed phase-OTDR", Opt. Fiber Technol., 36 (2017) pp. 19-25, DOI:10.1016/j.yofte. 2017.02. 005.
Maria Rosario Fernandez-Ruiz, Hugo F. Martins, "Steady-Sensitivity Distributed Acoustic Sensors", J. Lightwave Technol. 36, 5690-5696 (2018).
C. D. Butter and G. B. Hocker, "Fiber optics strain gauge", Appl. Opt. 17, 2867-2869 (1978).
A. E. Alekseev et al., Laser Phys., 29 (2019) 055106.

\* cited by examiner

OPTICAL PULSE TEST METHOD AND OPTICAL PULSE TEST EQUIPMENT

CROSS-REFERENCE TO RELATED APPLICATIONS

This application is a 371 U.S. National Phase of International Application No. PCT/JP2019/040821, filed on Oct. 17, 2019. The entire disclosure of the above application is incorporated herein by reference.

TECHNICAL FIELD

The present disclosure relates to an optical pulse test method and an optical pulse test equipment which enable a sampling rate to be improved and an anti-fading measure to be implemented by frequency multiplexing in optical fiber vibration sensing.

BACKGROUND ART

As means for distributively measuring a physical vibration applied to an optical fiber in an optical fiber longitudinal direction, a method called DAS (Distributed Acoustic Sensing) is known in which pulse test light is input to a measured optical fiber and back-scattered light due to Rayleigh scattering is detected (for example, refer to NPL 1).

In DAS, a variation in an optical path length of an optical fiber caused by a physical vibration applied to the optical fiber is captured to perform sensing of the vibration. Detecting a vibration enables a movement of an object or the like in a periphery of the measured optical fiber to be detected.

As a detection method of back-scattered light in DAS, there is a method called DAS-I (DAS-Intensity) in which scattered light intensity from each location of a measured optical fiber is measured and a time variation of the scattered light intensity is observed. Although DAS-I characteristically enables an equipment configuration to be simplified, since a variation in an optical path length of a fiber caused by a vibration cannot be quantitatively calculated from scattered light intensity, DAS-I is a qualitative measurement method (for example, refer to NPL 2).

On the other hand, DAS-P (DAS-Phase) which is a method of measuring a phase of scattered light from each location of a measured optical fiber and observing a time variation of the phase has also been researched and developed. While DAS-P is more complicated than DAS-I in terms of equipment configuration and signal processing, since a phase linearly changes with respect to a variation in an optical path length of a fiber due to a vibration and a rate of change is the same in a longitudinal direction of the optical fiber, a quantitative measurement of the vibration can be performed and the vibration applied to the measured optical fiber can be accurately reproduced (for example, refer to NPL 2).

In measurement based on DAS-P, pulse light is input to a measured optical fiber and a phase of scattered light at a time point t of incidence of the pulse light is distributively measured in a longitudinal direction of the optical fiber. In other words, a phase $\theta$ (l, t) of scattered light is measured when l denotes a distance from an incidence end of the optical fiber. By repetitively inputting the pulse light to the measured optical fiber at a time interval T, a time variation $\theta$ (l, t) of the phase of light scattered at a time point t=nT, where n denotes an integer, is measured for each point in the longitudinal direction of the measured optical fiber. However, in reality, the time point at which a point at the distance l is measured lags behind the time point of incidence of the pulse by a time it takes for the pulse light to be propagated by a distance t from the incidence end. Furthermore, attention should be given to the fact that a time point of measurement by a measuring instrument lags behind by a time it takes for scattered light to return to the incidence end. A magnitude at each time point nT of a physical vibration applied within a section from the distance l to a distance l+δl is known to be proportional to a difference δθ (l, nT) between a phase $\theta$ (l+δl, nT) at the distance l+δl and the phase $\theta$ (l, nT) at the distance l. In other words, based on a time point of zero, the following equation is satisfied.

[Math. 1]

$$\begin{aligned}\text{(Magnitude of vibration)} &\propto \delta\theta(l, nT) - \delta\theta(l, 0) \\ &= [(\theta(i + \delta l, nT) - \theta(l, nT)] - \\ &\quad [\theta(l + \delta l, 0) - \theta(l, 0)] \\ &= [(\theta(i + \delta l, nT) - \theta(l + \delta l, 0)] - \\ &\quad [\theta(l, nT) - \theta(l, 0)]\end{aligned} \quad (1)$$

Equipment configurations for detecting a phase of scattered light include a configuration for direct detection in which back-scattered light from a measured optical fiber is directly detected by a photodiode or the like and a configuration using coherent detection in which the back-scattered light is multiplexed with separately-prepared reference light and then detected (for example, refer to NPL 1).

Although mechanisms for performing coherent detection and calculating a phase are further divided into mechanisms for performing software-based processing using Hilbert transform and mechanisms for performing hardware-based processing using a 90-degree optical hybrid, in both methods, an in-phase component I (l, nT) and a quadrature component Q (l, nT) of scattered light are acquired and a phase is calculated according to the following equation.

[Math. 2]

$$\theta_{cal}(l, nT) = \text{Arc tan}\left[\frac{Q(l, nT)}{I(l, nT)}\right] \quad (2)$$

However, since an output value by a four-quadrant arctangent operator Arctan is given in radians within a range of $(-\pi, \pi]$ and, when m represents any integer, all of $2m\pi+\theta$ (l, nT) represent a same vector direction on an xy plane, an indeterminacy of $2m\pi$ exists in $\theta_{cal}$ (l, nT) calculated above.

Therefore, as a more accurate evaluation method of $\theta$ (l, nT), signal processing such as phase unwrapping is further performed. In general phase unwrapping, if an unwrapped phase is expressed as
[Math. 2a]

$$\theta_{cal}^{unwrap} \quad (2a)$$

with p representing any integer, when
[Math. 2b]

$$|\theta_{cal}(l,(p+1)T) - \theta_{cal}^{unwrap}(l,pT)| \quad (2b)$$

becomes larger than $\pi$ radian, an appropriate integer q that causes
[Math. 2c]

$$|\theta_{cal}(l,(p+1)T) + 2\pi q - \theta_{cal}^{unwrap}(l,pT)| \quad (2c)$$

to be equal to or smaller than π radian is selected, and with
[Math. 2d]

$$\theta_{cal}^{unwrap}(l,(p+1)T) \qquad (2d)$$

representing an unwrapped phase, the following equation is calculated.
[Math. 3]

$$\theta_{cal}^{unwrap}(l,(p+1)T)=\theta_{cal}(l,(p+1)T)+2\pi q \qquad (3)$$

A superscript unwrap represents an unwrapped phase.

In measurement according to DAS, noise attributable to a measuring instrument such as a thermal noise of a PD for detecting light, a noise in a subsequent electric stage, and a shot noise in light is present. Therefore, an intensity and a phase of scattered light to be measured are also affected by noise attributable to the measuring instrument.

In particular, when measuring a phase of scattered light, an increase of the effect of noise of a measuring instrument does not simply cause an increase in uncertainty of the phase but also causes an increase in the probability that a significantly different measured value is obtained as compared to an ideal phase value in a case where there is no noise.

For example, in the case of coherent detection, with respect to a vector of a measured scattered light when an in-phase component is plotted on an abscissa and a quadrature component is plotted on an ordinate, while an orientation of the vector when there is no noise corresponds to a phase to be measured, the orientation of the vector faces an opposite direction when the effect of noise is large, and compared to an ideal phase value in a case where there is no noise, the probability that an actually measured phase value ends up being a value that differs by around π radian increases. At such a point, when calculating a magnitude of a vibration using expression (1), a false recognition that a large physical force is applied to an optical fiber may be made. In addition, when the effect of noise increases, in the unwrapping processing represented by expression (3), points where the integer q is erroneously selected increase and a difference in phase values of 2 π or more which does not actually exist ends up being created between before and after a point where such an erroneous selection is made. Such a difference in phase values also causes a false recognition that a large physical force is applied to an optical fiber to be made when calculating a magnitude of a vibration using expression (1).

In order to accurately measure a phase, an effect of noise of a measuring instrument must be reduced. When the noise of a measuring instrument can be considered to be more or less the same at each point and each time point, since the effect of noise of the measuring instrument increases when intensity of scattered light itself decreases, the effect of the noise of the measuring instrument can be reduced if the intensity of scattered light can be increased at each point and each time point.

Loss due to absorption and scattering which is created as pulse light to be a probe propagates through a measured optical fiber is not the only cause of a decrease in the intensity of scattered light itself. Since pulse light with a limited time width is input to the measured optical fiber and a scatter of the pulse light is detected, interference of scattered light occurs from a large number of scatterers that are extremely finely distributed on the measured optical fiber. As a result of such interference, a point occurs where the intensity of scattered light decreases in accordance with a distribution of scatterers at each time point in the longitudinal direction of the measured optical fiber. This phenomenon is called fading (for example, refer to NPL 3).

Therefore, there is a problem when measuring a phase of scattered light according to DAS-P in that, in order to reduce an effect of noise of a measuring instrument, points where intensity of scattered light at each time point decreases must be prevented from being created due to fading.

Means for solving this problem includes simply increasing peak intensity of an incident optical pulse. However, increasing the peak intensity generates a non-linear effect and characteristics of pulse light vary as the pulse light propagates through a measured optical fiber. Therefore, the peak intensity of optical pulses that can be input is restricted and the problem described above is not always sufficiently solvable.

In order to solve the problem described above, a phase measurement method and a signal processing equipment are proposed which are capable of reducing an effect of noise of a measuring instrument without increasing peak intensity of an incident optical pulse when measuring a phase of scattered light according to DAS-P (for example, refer to NPL 4).

In NPL 4, in order to solve the problem described above, pulse light created by arranging and wavelength-multiplexing pulses with different optical frequency components is input to a measured optical fiber at time intervals that enable a change in a fiber state due to a vibration to be ignored, a scattered light vector is created by plotting scattered light at each wavelength from the measured optical fiber on a two-dimensional plane with an in-phase component as an abscissa thereof and a quadrature component as an ordinate thereof, orientations of the created scattered light vectors are aligned by rotating the scattered light vectors for each wavelength at each point on the measured optical fiber, a new vector is created by averaging vectors of which orientations have been aligned, and a phase is calculated using values of an in-phase component and a quadrature component of the newly created vector.

Measurement according to DAS-P also has a problem in that a trade-off arises between measurement distance and an upper limit of vibrational frequencies that can be measured. When an optical pulse with a single frequency is used, the longer the measurement distance, the greater a lag of a time point of return of scattered light from a distal end with respect to a time point of pulse incidence. Therefore, in order to prevent scattered light from the distal end and scattered light from near an incidence end when inputting a next optical pulse from becoming multiplexed, an upper limit arises in a repetition frequency at which optical pulses are to be input. As a result, according to the sampling theorem, there is a problem regarding a vibration with a larger vibrational frequency than a Nyquist frequency that is ½ times the repetition frequency in that the vibration cannot be correctly measured due to aliasing.

NPL 5 is proposed as a solution to the problem described above. In NPL 5, in order to solve the problem described above, pulse light created by arranging and wavelength-multiplexing pulses with different optical frequency components is input to a measured optical fiber at temporally regular intervals, and a scattered light vector is created by plotting scattered light at each wavelength from the measured optical fiber on a two-dimensional plane with an in-phase component as an abscissa thereof and a quadrature component as an ordinate thereof. By concatenating an angle of a scattered light vector corresponding to a different optical frequency as a light phase at a different time point, with respect to a measurable vibrational frequency fv that is determined according to a measurement distance in a case of a single optical frequency, the measurable vibrational frequency can be set to N×fv due to N-wave multiplexing.

However, since the trade-off between the measurement distance and an upper limit of measurable vibrational frequencies requires that phase unwrapping be correctly performed, conditions become even more severe. When an absolute value of a magnitude of phase change when sampling adjacent optical pulses changes significantly more than π, since phase unwrapping can no longer be uniquely performed, phase unwrapping fails (for example, refer to NPL 6).

Therefore, a constraint arises in that an upper limit of an absolute value of a magnitude of phase change at adjacent sampling points is π. Specifically, even within a range equal to or lower than the Nyquist frequency, since the higher the vibrational frequency, the larger a phase change amount at adjacent sampling points even when a vibrational amplitude is the same, conditions on the upper limit of a measurable vibrational frequency become even more severe.

It should be noted that a relationship between a magnitude of phase change and an amount of distortion applied to a fiber by a vibration is described in, for example, NPL 7.

According to NPL 7, when a fiber with a total length of l elongates by Δl due to an amount of distortion ε, an amount of increase ΔΦ of phase change when light passes the elongated length of Δl is expressed by the following equation:

[Math. 4]
$$\Delta\phi = \varepsilon l \left[ k - \frac{1}{2}kn^2((1-\mu_p)p_{12} - \mu_p p_{11}) \right] \quad (4)$$

where $k=2\pi n/\lambda$ represents a propagation constant, n represents an effective refractive index of the fiber, $\mu_p$ represents Poisson's ratio, and $p_{11}$ and $p_{12}$ represent strain-optic tensor components. Note that the amount of distortion s is defined as Δl/l representing a ratio of an amount of change to an original length of the fiber. For example, considering a case of λ=1555 nm that is near an ordinary communication wavelength band, since n=1.47, $\mu_p$=0.17, $p_{11}$=0.121, and $p_{12}$=0.271, it is known that

[Math. 5]
$$\Delta\phi = K\varepsilon l \quad (5)$$

is satisfied, where K=4.6×10⁶ m⁻¹ (for example, refer to PTL 8). Using this relational expression enables a condition on a magnitude of phase change to be replaced with a condition on an amount of distortion.

CITATION LIST

Non Patent Literature

[NPL 1] A. Masoudi, T. P. Newson, "Contributed Review: Distributed optical fibre dynamic strain sensing", Review of Scientific Instruments, vol. 87, p. 011501 (2016)

[NPL 2] Ken'ichi Nishiguchi, Li Che-Hsien, Artur Guzik, Mitsunori Yokoyama, Kinzo Masuda, "Fabrication of Fiber-Optic Distributed Acoustic Sensor and Its Signal Processing", IEICE Tech. Rep., vol. 115 (202), pp. 29-34 (2015)

[NPL 3] G. Yang et al., "Long-Range Distributed Vibration Sensing Based on Phase Extraction from Phase-Sensitive OTDR", IEEE Photonics Journal, vol. 8, no. 3, 2016.

[NPL 4] Yoshifumi Wakisaka, Daisuke Iida, Keiji Okamoto, Hiroyuki Oshida, "*Shuuhasuu tajuuisou OTDR wo mochiita bunpushindoukeisokuhouhou* (Distributed Vibration Sensing Method with Frequency-Multiplexed Phase-OTDR)", 2019 IEICE Society Conference, Aug. 27, 2019

[NPL 5] D. Iida, K. Toge, T. Manabe, 'Distributed measurement of acoustic vibration location with frequency multiplexed phase-OTDR', Opt. Fiber Technol., 36 (2017) pp. 19-25, DOI: 10.1016/j.yofte.2017.02.005

[NPL 6] Maria Rosario Fernandez-Ruiz, Hugo F. Martins, "Steady-Sensitivity Distributed Acoustic Sensors", J. Lightwave Technol. 36, 5690-5696 (2018)

[NPL 7] C. D. Butter and G. B. Hocker, "Fiber optics strain gauge", Appl. Opt. 17, 2867-2869 (1978)

[NPL 8] A. E. Alekseev et al., Laser Phys., 29 (2019) 055106

SUMMARY OF THE INVENTION

Technical Problem (Problem 1) A design method with respect to the number of multiplexed frequencies that is necessary when performing a method of frequency multiplexing such as that described in NPL 5 in order to measure an object vibrational frequency while taking into consideration the trade-off between a measurement distance and an upper limit of a measurable vibrational frequency described above has yet to be revealed. Since increasing the number of multiplexes of optical frequencies necessitates increasing bands of a transmitting system and a receiving system and requires cost, a method of designing a necessary minimum number of multiplexed frequencies is needed.

(Problem 2) When performing a frequency multiplexing method such as that described in NPL 5, there is a problem in that a measured phase change becomes distorted with respect to an actual phase change unless an angle difference between respective optical frequencies is corrected. A solution to this problem has yet to be proposed.

(Problem 3) A configuration method of an optical frequency pulse and a reception signal processing method when simultaneously performing a method of frequency multiplexing such as that described in NPL 5 for solving the trade-off between a measurement distance and an upper limit of a measurable vibrational frequency and the method of frequency multiplexing described in NPL 4 as an anti-fading measure have yet to be proposed.

Therefore, in order to solve the problems described above, an object the present invention is threefold:

(Object 1) To solve problem 1 described above. More specifically, to propose a design method of a minimum value of the number of multiplexed frequencies that is necessary when performing a method of frequency multiplexing such as that described in NPL 5 in order to measure an object vibrational frequency while taking into consideration the trade-off between a measurement distance and an upper limit of a measurable vibrational frequency described above.

(Object 2) To solve problem 2 described above. More specifically, to propose a configuration method of an optical frequency pulse and a reception signal processing method for correcting an angle difference between respective optical frequencies when performing a frequency multiplexing method such as that described in NPL 5.

(Object 3) To solve problem 3 described above. More specifically, to propose a configuration method of an optical frequency pulse and a reception signal processing method when simultaneously performing a method of frequency multiplexing such as that described in NPL 5 for solving the trade-off between a measurement distance and an upper limit of a measurable vibrational frequency and the method of frequency multiplexing described in NPL 4 as an anti-fading measure.

Means for Solving the Problem

In order to achieve object 1 described above, an optical pulse test method according to the present invention includes the steps of:

inputting an optical pulse sequence of which the number of wavelength multiplexes is N and in which optical pulses with different optical frequencies are arranged at temporally regular intervals to one end of a measured optical fiber;

receiving scattered light of each wavelength having returned to the one end of the measured optical fiber;

observing a vibration of the measured optical fiber as a time variation of a phase component of the scattered light; and determining the number of wavelength multiplexes N as a minimum value satisfying Math. C1.

[Math. C1]

$$\text{When } F_v(t) < \pi \qquad \text{(C1)}$$
$$N \geq \frac{4Zf_v^{max}}{v}$$
$$\text{when } F_v(t) \geq \pi \cdot$$
$$N > \frac{2Z}{vC_{max}^{-1}(\pi)}$$

where t represents time,

Z represents a length of the measured optical fiber (measurement distance), v represents the speed of light inside the measured optical fiber, $F_v(t)$ represents a time waveform of a phase change in an arbitrary section of the measured optical fiber, $\tilde{F}_v(f_v)$ represents a function obtained by a Fourier transform of $F_v(t)$, $f_v^{max}$ represents a maximum value of a frequency range occupied by $\tilde{F}_v(f_v)$, C(t) represents an absolute value of a phase change between a time point t and a time point $t+T_N$, $C_{max}(T_N)$ represents a maximum value of C(t) when arbitrarily changing the time point t, $C_{max}^{-1}(F_v)$ represents an inverse function of $C_{max}(T_N)$, and $F_v$ represents a difference between a maximum value and a minimum value of $F_v(t)$.

When $F_v(t)$ is a single vibrational frequency A×sin ($2\pi f_v t$), the number of wavelength multiplexes N is determined as the minimum value satisfying Math. C1a.

[Math. C1a]

$$\text{When } A < \frac{\pi}{2} \qquad \text{(C1a)}$$
$$N \geq \frac{4Zf_v}{v}$$
$$\text{when } A \geq \frac{\pi}{2}$$
$$N > \frac{22\pi f_v}{v} \cdot \frac{1}{\text{Arc sin}\left(\frac{\pi}{2A}\right)}$$

where $f_v$ represents a vibrational frequency.

In addition, an optical pulse test equipment according to the present invention includes:

a light source which inputs an optical pulse sequence of which the number of wavelength multiplexes is N and in which optical pulses with different optical frequencies are arranged at temporally regular intervals to one end of a measured optical fiber;

an optical receiver which receives scattered light of each wavelength having returned to the one end of the measured optical fiber;

a signal processing unit which observes a vibration of the measured optical fiber as a time variation of a phase component of the scattered light; and a calculating unit which determines the number of wavelength multiplexes N as a minimum value satisfying Math. C1.

In order to achieve object 2 described above, an optical pulse test method according to the present invention includes the steps of:

inputting, before inputting the optical pulse sequence to the one end of the measured optical fiber, a correction optical pulse sequence in which optical pulse pairs in which the optical pulses with different optical frequencies are arranged at shorter intervals than the optical pulse intervals of the optical pulse sequence are arranged to the one end of the measured optical fiber; and calculating a correction value of the phase component of the scattered light by Math. C2.

[Math. C2]

$$\phi(j(m'), i(m)) = \qquad \text{(C2)}$$
$$\arg\left[\frac{1}{P}\sum_{p=1}^{P} R[\arg\{r_{i(m)}(z, t_p + 2z/v)\}]r_{i(m')}(z, t_p + 2z/v)\right]$$

where $\Phi(i(m'), i(m))$ represents an angle difference between two of the optical pulses with different optical frequencies, P represents the number of the optical pulse pairs included in the correction optical pulse sequence, p represents a number (an integer from 1 to P) of the optical pulse pair, $t_p$ represents a time at which the p-th optical pulse pair is input to the one end of the measured optical fiber, z represents a distance from the one end of the measured optical fiber, $r_{i(m)}(z, t_p+2z/v)$ and $r_{i(m')}(z, t_p+2z/v)$ represent complex vectors of scattered light from the distance z, an arg function represents a function which calculates a deflection angle of a complex vector of an argument within a range from $-\pi$ to $\pi$ and which outputs a real number, and R(*) represents an operator which rotates a complex vector r clockwise by an angle * on a complex plane.

In addition, in an optical pulse test equipment according to the present invention, the light source inputs, before inputting the optical pulse sequence to the one end of the measured optical fiber, a correction optical pulse sequence in which optical pulse pairs in which the optical pulses with different optical frequencies are arranged at shorter intervals than the optical pulse intervals of the optical pulse sequence are arranged to the one end of the measured optical fiber; and the signal processing unit calculates a correction value of the phase component of the scattered light by Math. C2.

In order to achieve object 3 described above, an optical pulse test method according to the present invention includes the steps of: forming an optical pulse that forms an optical pulse sequence by arranging M-number of minute optical pulses with different optical frequencies at shorter intervals than the optical pulse intervals of the optical pulse sequence; and setting the number M of the minute optical pulses so that $1/\sqrt{M}$ times a noise level is equal to or lower than a predetermined value.

The following methods can also be used to achieve object 3 described above.

(Method A)

An optical pulse test method according to the present invention includes the steps of:
forming M-number of groups in which N×M+1-number (where N and M are natural numbers) of minute optical pulses with different optical frequencies are arranged;
arranging the M-number of groups and segmenting M-numbers of the minute optical pulses from the top group of the groups to form N×M+1-number of optical pulse pairs;
inputting an optical pulse sequence in which the N×M+1-number of optical pulse pairs are arranged at temporally regular intervals to one end of a measured optical fiber;
receiving scattered light of each wavelength having returned to the one end of the measured optical fiber;
observing a vibration of the measured optical fiber as a time variation of a phase component of the scattered light;
determining the number of wavelength multiplexes N as a minimum value satisfying Math. C1; and
setting the number of wavelength multiplexes M so that $1/\sqrt{M}$ times a noise level is equal to or lower than a predetermined value.

(Method B)

An optical pulse test method according to the present invention includes the steps of:
forming N+1-number of groups in which N×M-number (where N and M are natural numbers) of minute optical pulses with different optical frequencies are arranged;
arranging the N+1-number of groups and segmenting M-numbers of the minute optical pulses from the top group of the groups to form N(N+1)-number of optical pulse pairs;
adding an additional minute optical pulse of which an optical frequency differs from the optical frequency of any of the minute optical pulses to each of N+1-number of optical pulse pairs among the N(N+1)-number of optical pulse pairs;
inputting an optical pulse sequence in which the N(N+1)-number of optical pulse pairs including the optical pulse pairs to which the additional minute optical pulse has been added are arranged at temporally regular intervals to one end of a measured optical fiber;
receiving scattered light of each wavelength having returned to the one end of the measured optical fiber;
observing a vibration of the measured optical fiber as a time variation of a phase component of the scattered light;
determining the number of wavelength multiplexes N as a minimum value satisfying Math. C1; and
setting the number of wavelength multiplexes M so that $1/\sqrt{M}$ times a noise level is equal to or lower than a predetermined value.

(Method C)

An optical pulse test method according to the present invention includes the steps of:
forming (N+1) M+1-number of groups in which N×M+1-number (where N and M are natural numbers) of minute optical pulses with different optical frequencies are arranged;
arranging the (N+1)M+1-numbers of groups and segmenting the minute optical pulses from the top group of the groups so that M+1-number of the minute optical pulses are included in a 1+k(N+1)-th pulse pair and M-number of the minute optical pulses are included in the other pulse pairs to form (N×M+1) (N+1)-number of the optical pulse pairs;
inputting an optical pulse sequence in which the (N×M+1) (N+1)-number of optical pulse pairs are arranged at temporally regular intervals to one end of a measured optical fiber;
receiving scattered light of each wavelength having returned to the one end of the measured optical fiber;
observing a vibration of the measured optical fiber as a time variation of a phase component of the scattered light;
determining the number of wavelength multiplexes N as a minimum value satisfying Math. C1; and
setting the number of wavelength multiplexes M so that $1/\sqrt{M}$ times a noise level is equal to or lower than a predetermined value.

It should be noted that the respective inventions described above can be combined to the greatest extent possible.

Effects of the Invention

The present invention can provide an optical pulse test method and an optical pulse test equipment as follows.
(1) Capable of designing a minimum value of the number of multiplexed frequencies that is necessary when performing a method of frequency multiplexing such as that described in NPL 5 in order to measure an object vibrational frequency while taking into consideration the trade-off between a measurement distance and an upper limit of a measurable vibrational frequency.
(2) Capable of correcting an angle difference between respective optical frequencies when performing a frequency multiplexing method such as that described in NPL 5.
(3) Capable of simultaneously performing a method of frequency multiplexing such as that described in NPL 5 for solving the trade-off between a measurement distance and an upper limit of a measurable vibrational frequency and the method of frequency multiplexing described in NPL 4 as an anti-fading measure.

DESCRIPTION OF EMBODIMENTS

Figure 1:
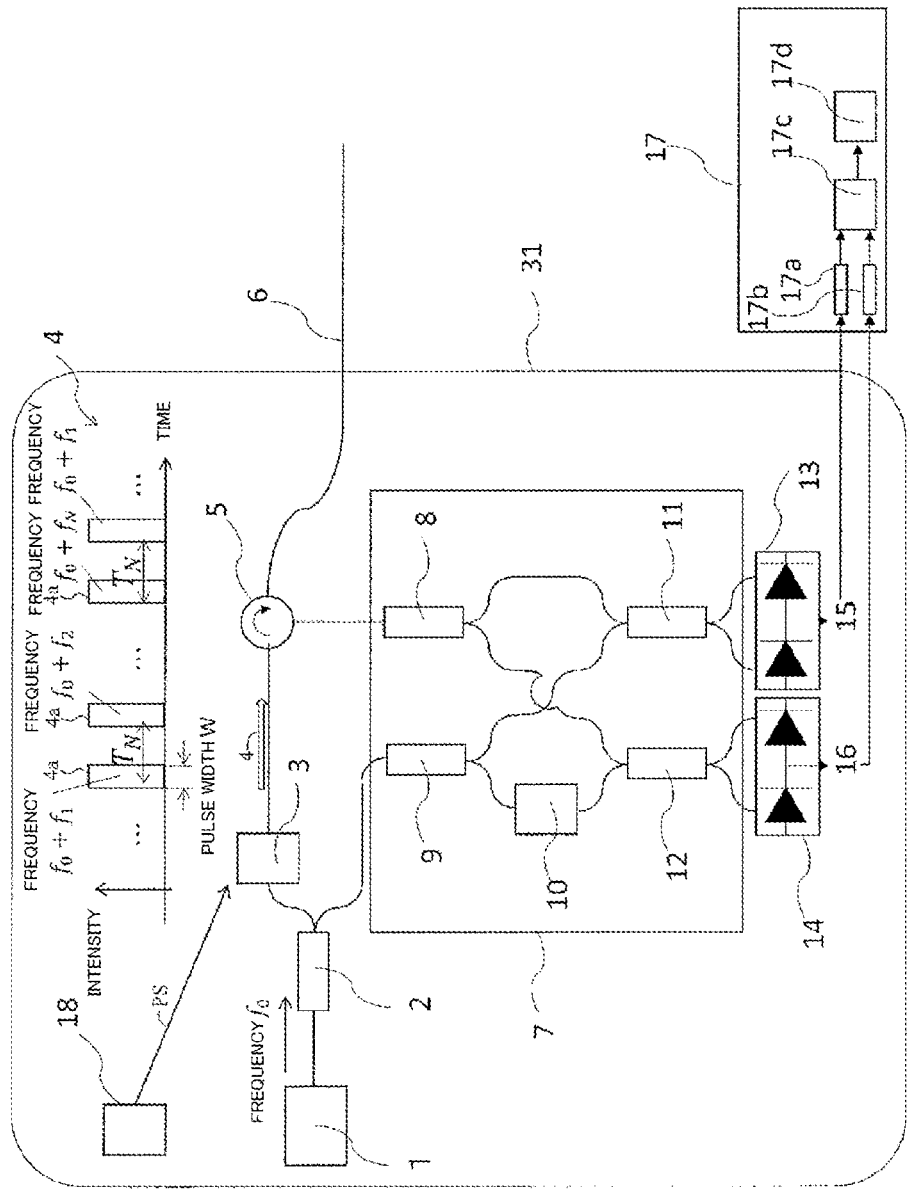
FIG. 1 is a diagram for describing an optical pulse test equipment according to the present invention.

Hereinafter, embodiments of the present invention will be described with reference to the accompanying drawings. It is to be understood that the embodiments described below are embodiments of the present invention and that the present invention is not limited to the embodiments described below. It is also to be understood that constituent elements with a same reference sign in the present specification and in the drawings represent the same constituent element.

First Embodiment

FIG. 1 is a diagram for describing a vibration detection equipment that performs vibration detection using DAS-P according to the present embodiment.

The present vibration detection equipment is an optical pulse test equipment, including:
  a light source which inputs an optical pulse sequence of which the number of wavelength multiplexes is N and in which optical pulses with different optical frequencies are arranged at temporally regular intervals to one end of a measured optical fiber;
  an optical receiver which receives scattered light of each wavelength having returned to the one end of the measured optical fiber;
  a signal processing unit which observes a vibration of the measured optical fiber as a time variation of a phase component of the scattered light; and
  a calculating unit 18 which determines the number of wavelength multiplexes N as a minimum value satisfying Math. C1.

A CW light source 1, a coupler 2, and an optical modulator 3 corresponds to the light source. A 90-degree optical hybrid 7 and balance detectors (13 and 14) correspond to the optical receiver. The optical receiver performs coherent detection using the 90-degree optical hybrid 7. A signal processing equipment 17 corresponds to the signal processing unit.

Figure 21:
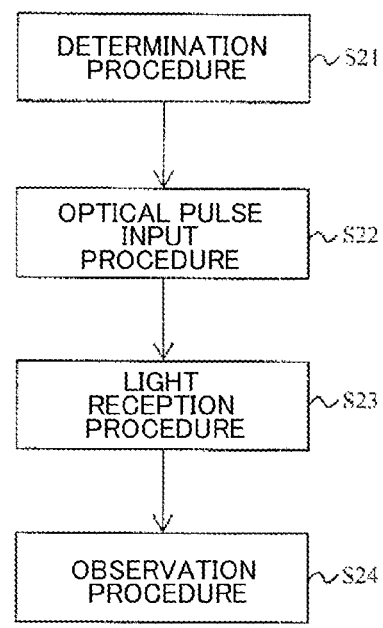
FIG. 21 is a flow chart for describing an optical pulse test method according to the present invention.

FIG. 21 is a flow chart for describing an optical pulse test method to be performed by the present vibration detection equipment. The present optical pulse test method includes the steps of:
  determining the number of wavelength multiplexes N as a minimum value satisfying Math. C1 (step S21);
  inputting an optical pulse sequence of which the number of wavelength multiplexes is N and in which optical pulses with different optical frequencies are arranged at temporally regular intervals to one end of a measured optical fiber 6 (step S22);
  receiving scattered light of each wavelength having returned to the one end of the measured optical fiber 6 (step S23); and
  observing a vibration of the measured optical fiber 6 as a time variation of a phase component of the scattered light (step S24).

A measuring instrument 31 measures scattered light from the measured optical fiber 6 as follows. Continuous light with a single wavelength and a frequency of $f_0$ is emitted from the CW light source 1 and branched into reference light and probe light by the coupler 2. The probe light is shaped by the optical modulator 3 into an wavelength-multiplexed optical pulse such as an optical pulse 4. The optical pulse 4 is constructed by arranging i=1, 2, ..., N (where N is an integer)-number of minute pulses 4a of which a frequency is $f_0+f_i$ (where i is an integer) and a pulse width is set to a value W that corresponds to a spatial resolution of measurement in an optical fiber longitudinal direction. Pulses with adjacent optical frequencies are arranged at a regular interval $T_N$, and a pulse of which i=1 is arranged at the same interval $T_N$ next to a pulse of which i=N. A frequency setting of the optical frequency $f_i$ is designed so that bands of scattered light of the respective optical frequencies do not overlap with each other. As a guide, optical frequencies are set such that a difference between any of the optical frequencies is always 2/W or more.

A type of the optical modulator 3 is not specifically designated as long as the optical pulse 4 can be generated and, in some cases, the optical modulator 3 is provided in plurality. For example, an SSB modulator or a frequency-variable AO modulator may be used, or intensity modulation by SOA or the like may be further performed in order to increase an extinction ratio due to pulsation.

The optical pulse 4 is input to the measured optical fiber 6 via a circulator 5. Light scattered at each point in a longitudinal direction of the optical fiber 6 returns to the circulator 5 as back-scattered light and is input to one input unit of the 90-degree optical hybrid 7. The reference light branched by the coupler 2 is input to another input unit of the 90-degree optical hybrid 7.

The 90-degree optical hybrid 7 may be internally configured in any way as long as a function of a 90-degree optical hybrid is provided. A configuration example thereof is shown in FIG. 1. Back-scattered light is input to a coupler 8 with a branching ratio of 50:50, and the two branched beams of scattered light are input to input units of a coupler 12 with a branching ratio of 50:50 and a coupler 11 with a branching ratio of 50:50. The reference light is input to a coupler 9 with a branching ratio of 50:50, and one of the two branched beams of the reference light is input to the input unit of the coupler 11 and the other is input to the input unit of the coupler 12 after having its phase being shifted by $\pi/2$ by a phase shifter 10.

Two outputs of the coupler 11 are detected by the balance detector 13 and an electrical signal 15 that is an analog in-phase component $I^{analog}$ is output. Two outputs of the coupler 12 are detected by the balance detector 14 and an electrical signal 16 that is an analog quadrature component $Q^{analog}$ is output.

The electrical signal 15 and the electrical signal 16 are sent to a signal processing equipment 17 provided with an AD conversion function element 17a and an AD conversion function element 17b which are capable of sampling a frequency range of a signal without aliasing. In the signal processing equipment 17, with respect to signals of a digitalized in-phase component $I^{digital}$ and a digitalized quadrature component $Q^{digital}$ having been output from the AD conversion function element 17a and the AD conversion function element 17b, signals due to scattered light created by pulses of the respective frequencies $f_0+f_i$ (i=1, 2, . . . , N) that constitute the optical pulse 4 are separated by a signal processing unit 17c.

In other words, the signal processing unit 17c separates an in-phase component $I_i^{measure}$ and a quadrature component $Q_i^{measure}$ that are obtained when independently inputting a pulse of each frequency component $f_0+f_i$ by performing signal processing with respect to $I^{digital}$ being a superposition of in-phase components related to all i and $Q^{digital}$ being a superposition of quadrature components related to all i. As a specific signal processing method, any method may be used as long as $I_i^{measure}$ and $Q_i^{measure}$ can be accurately separated from $I^{digital}$ and $Q^{digital}$. For example, a method is conceivable in which $I_i^{measure}$ and $Q_i^{measure}$ are calculated by respectively passing $I^{digital}$ and $Q^{digital}$ through a digital bandpass filter of which a central frequency is $f_0+f_i$ and a passband is 2/W and guaranteeing a phase delay.

In addition, while separation into each frequency component is performed after subjecting an in-phase component and a quadrature component that are in a state of an analog electrical signal to AD conversion and digitalization, alternatively, AD conversion may be performed after separating an in-phase component and a quadrature component that are in a state of an analog electrical signal into each frequency component using an analog electric filter.

Based on $I_i^{measure}$ and $Q_i^{measure}$ acquired by the signal processing unit 17c, a phase is calculated by a signal processing unit 17d. First, a complex vector $r_i$ is created on an xy plane of which an x-axis (a real number axis) represents an in-phase component and a y-axis (an imaginary number axis) represents a quadrature component.

[Math. 1-1]

$$r_i = (I_i^{measure}, Q_i^{measure}) \tag{1-1}$$

In addition, an angle $\theta_i$ of the complex vector is calculated as follows.

[Math. 1-2]

$$\theta_i = \text{Arc tan}\left[\frac{Q_i^{measure}}{I_i^{measure}}\right] \tag{1-2}$$

In this case, considering the fact that a pulse of each optical frequency fi is incident at a time point $i \times T_N + n \times N \times T_N$ (where n is any integer), a state of an optical fiber at a position on the optical fiber at a distance z from an incidence end in a longitudinal direction of the optical fiber is measured at a time point $i \times T_N + n \times N \times T_N + z/v$ (where n is any integer) in consideration of a propagation time of an optical pulse, where v represents the speed of light in the optical fiber. Furthermore, considering the time it takes for scattered light having been scattered to propagate and return to the incidence end, a measurement time point in the measuring instrument is $i \times T_N + n \times N \times T_N + 2z/v$ (where n is any integer). Therefore, by positively representing the measurement time point of the measuring instrument, the complex vector $r_i$ of scattered light at a point of the distance z is described as $r_i$ (z, $iT_N + nNT_N + 2z/v$).

In the present embodiment, a phase $\theta$ (z, $mT_N + 2z/v$) (where m represents an integer) at a measurement time point $mT_N + 2z/v$ is calculated as follows using i and n that satisfy $mT_N + 2z/v = iT_N + nNT_N + 2z/v$.

[Math. 1-3]

$$\theta\left(z, mT_N + \frac{2z}{v}\right) = \theta_i\left(iT_N + nNT_N + \frac{2z}{v}\right) \tag{1-3}$$

In addition, a phase change due to a vibration applied within a section from a distance $z_1$ to a distance $z_2$ on the optical fiber is calculated by using Math. 1-3c to represent a difference between Math. 1-3a and Math. 1-3b.

[Math. 1-3a]

$$\theta\left(z_2, mT_N + \frac{2z_2}{v}\right) \tag{1-3a}$$

-continued

[Math. 1-3b]

$$\theta\left(z_1, mT_N + \frac{2z_1}{v}\right) \quad (1\text{-}3b)$$

[Math. 1-3c]

$$\theta\left(z_2, mT_N + \frac{2z_2}{v}\right) - \theta\left(z_1, mT_N + \frac{2z_1}{v}\right) \quad (1\text{-}3c)$$

Since a time point of a moment at which a state of the optical fiber is measured does not include a time required by scattered light to return to the incidence end as described above, a time point at a point of the distance $z_1$ is $mT_N + z_1/v$ and a time point at a point of the distance $z_2$ is $mT_N + z_2/v$, which means that there is a time difference of $(z_1-z_2)/v$. However, since a difference in distances between $z_1$ and $z_2$ is more or less equal to spatial resolution and is usually set to around several meters to several ten meters, the time difference $\theta(z_1-z_2)/v$ equates to several ten to several hundred ns and is extremely short compared to an ordinary scale of time variation of vibration to be a measurement object and, consequently, a difference in time points at which a state of the optical fiber is measured is negligible. Therefore, the vibration applied within the section can be correctly measured.

In this case, focusing on pulse sequences of respective individual frequencies $f_i$, the pulse sequences are separated from each other by intervals of $NT_N$. When the measurement distance is assumed to be Z, since a reciprocating time of an optical pulse is $2Z/v$, $NT_N$ must satisfy $NT_N \geq 2Z/v$. In other words, $T_N \geq 2Z/(vN)$. Even when the measurement distance Z is determined, a time interval $T_N$ of sampling can be made finer by increasing the number of multiplexes N.

In the present embodiment, a design method with respect to the number of multiplexed frequencies N that is necessary when taking into consideration the trade-off between a measurement distance and an upper limit of a measurable vibrational frequency is shown. The calculating unit 18 calculates the necessary number of multiplexes N in accordance with the design method described below, and by operating the optical modulator 3 based on information on the necessary number of multiplexes N, creates an optical pulse sequence 4 including the necessary number of multiplexes N.

First, a case where a vibration with a single vibrational frequency is measured will be considered. A condition in which a vibrational frequency $f_v$ is equal to or less than the Nyquist frequency is represented by

[Math. 1-4]

$$T_N \leq \frac{1}{2f_v} \quad (1\text{-}4)$$

In addition, when a phase change during an object section on the optical fiber is expressed as $A \times \sin(2\pi f_v t)$ using a coefficient A that is independent of time, an absolute value C(t) of a phase change during a period from a given time point t to a time point $t+T_N$ is

[Math. 1-5]

$$C(t)=|A \sin(2\pi f_v(t+T_N))-A \sin(2\pi f_v t)|=2A|\sin(\pi f_v T_N)\cos(\pi f_v(2t+T_N))| \quad (1\text{-}5)$$

Although the time variation $A \times \sin(2\pi f_v t)$ of a phase assumes an initial phase of zero, the following discussion does not lose its generality even if this assumption is made. While a magnitude of C(t) also changes depending on time t, a largest value is

[Math. 1-6]

$$C_{max}(T_N)=2A|\sin(\pi f_v T_N)| \quad (1\text{-}6)$$

A condition that phase unwrapping does not fail is represented by

[Math. 1-7]

$$C_{max}(T_N)=2A|\sin(\pi f_v T_N)|<\pi \quad (1\text{-}7)$$

This can be deformed to

[Math. 1-8]

$$C_{max}(T_N) = |\sin(\pi f_v T_N)| < \frac{\pi}{2A} \quad (1\text{-}8)$$

Since the expression above is always satisfied when $\pi/2A$ is larger than 1 or, in other words, when A is smaller than $\pi/2$, a condition that the vibrational frequency $f_v$ is equal to or less than the Nyquist frequency need only be considered. When A is equal to or larger than $\pi/2$, if $\pi f_v T_N < \pi/2$ is satisfied, the following deformation can be made.

[Math. 1-9]

$$T_N < \frac{1}{\pi f_v} \text{Arcsin}\left(\frac{\pi}{2A}\right) \quad (1\text{-}9)$$

It should be noted that the assumption that $\pi f_v T_N < \pi/2$ is satisfied is the same as the condition represented by expression (1-4) of the vibrational frequency $f_v$ being equal to or less than the Nyquist frequency while expression (1-9) obtained above represents a more severe constraint with respect to $T_N$. Therefore, to summarize the discussion described above, inequality (1-4) need be satisfied when A is smaller than $\pi/2$ and inequality (1-9) need be satisfied when A is equal to or larger than $\pi/2$. The number of multiplexes N has a condition represented by $NT_N \geq 2Z/v$ with respect to the measurement distance Z.

In other words, when A is smaller than $\pi/2$, a minimum N that satisfies

[Math. 1-10]

$$N \geq \frac{2Z}{T_N v} \geq \frac{4Zf_v}{v} \quad (1\text{-}10)$$

is set as the number of multiplexes to be used. Using the set N, $T_N$ can be set within a range satisfying $NT_N \geq 2Z/v$ and inequality (1-4). When increasing the measurement distance within a range satisfying $NT_N \geq 2Z/v$, $T_N$ is set to as large a value as possible, but when setting a fine sampling rate, $T_N$ is set to as small a value as possible.

In addition, when A is equal to or larger than π/2, a minimum N that satisfies

[Math. 1-11]

$$N \geq \frac{2Z}{T_N v} > \frac{2Z\pi f_v}{v} \cdot \frac{1}{\mathrm{Arcsin}\left(\frac{\pi}{2A}\right)} \quad (1\text{-}11)$$

is set as the number of multiplexes to be used. Using the set N, $T_N$ can be set within a range satisfying $NT_N \geq 2Z/v$ and inequality (1-9). When increasing the measurement distance within a range satisfying $NT_N \geq 2Z/v$, $T_N$ is set to as large a value as possible, but when setting a fine sampling rate, $T_N$ is set to as small a value as possible.

Next, an arbitrary vibration waveform will be considered. Let $F_v(t)$ represent a time waveform of a phase change in a section on an object optical fiber. Let a Fourier transform thereof be represented by

[Math. 1-11a]

$$\tilde{F}_v(f_v) \quad (1\text{-}11\mathrm{a})$$

Let a maximum value of a frequency range occupied by Math. 1-11a be

[Math. 1-11b]

$$f_v^{max} \quad (1\text{-}11\mathrm{b})$$

A condition in which a vibrational frequency of Math. 1-11b is equal to or less than the Nyquist frequency is represented by

[Math. 1-12]

$$T_N \leq \frac{1}{2f_v^{max}} \quad (1\text{-}12)$$

In addition, an absolute value C(t) of a phase change from a given time point t to a time point $t+T_N$ is represented by

[Math. 1-13]

$$C(t)=|F_v(t+T_N)-F_v(t)| \quad (1\text{-}13)$$

If a maximum value of C(t) when the time point t is arbitrarily changed is represented by $C_{max}(T_N)$, a condition that phase unwrapping does not fail is represented by

[Math. 1-14]

$$C_{max}(T_N) < \pi \quad (1\text{-}14)$$

When Math. 1-14 is satisfied with respect to any $T_N$ or, in other words, when a magnitude of a difference between a maximum value and a minimum value of $F_v(t)$ is smaller than π, the condition represented by expression (1-12) need only be considered. In other cases, in the condition that expression (1-12) is satisfied, $C_{max}$ is an increasing function with respect to $T_N$. In consideration thereof, an inverse function $C_{max}^{-1}$ of $C_{max}$ is calculated into expression (1-14) to obtain the following condition.

[Math. 1-15]

$$T_N < C_{max}^{-1}(\pi) \quad (1\text{-}15)$$

The condition represented by expression (1-15) constitutes a more severe constraint with respect to $T_N$ than the condition represented by expression (1-12). In consideration thereof, when the magnitude of the difference between the maximum value and the minimum value of $F_v(t)$ is smaller than π, the condition represented by expression (1-12) may be considered, but when the magnitude of the difference between the maximum value and the minimum value of Fv(t) is equal to or larger than π, the condition represented by expression (1-15) may be considered.

It should be noted that, as a method of calculating an inverse function, the calculation is derived using a mathematical expression when an analytical calculation can be performed. When an analytical calculation cannot be performed, a numerical calculation of C(t) is performed while sufficiently finely changing $T_N$ and t. Various known methods can be applied as a method of the numerical calculation. For example, $T_N$ is initially roughly varied to obtain a minimum $T_N$ that does not satisfy expression (1-14) and a maximum $T_N$ that satisfies expression (1-14). Within this range, $T_N$ is more finely varied to update the minimum $T_N$ that does not satisfy expression (1-14) and the maximum $T_N$ that satisfies expression (1-14). By repeating this step, a maximum $T_N$ that satisfies expression (1-15) can be calculated with sufficient accuracy.

With respect to the number of multiplexes N, in a similar manner to the case where a vibration with a single vibrational frequency has been considered, when the magnitude of the difference between the maximum value and the minimum value of $F_v(t)$ is smaller than π, a minimum N that satisfies a condition created by replacing $F_v$ in expression (1-10) with Math. 1-11b is set as the number of multiplexed frequencies. When the magnitude of the difference between the maximum value and the minimum value of $F_v(t)$ is equal to or larger than π, a minimum N that satisfies the following expression is set as the number of multiplexed frequencies.

[Math. 1-16]

$$N \geq \frac{2Z}{T_N v} > \frac{2Z}{v C_{max}^{-1}(\pi)} \quad (1\text{-}16)$$

$T_N$ may be set in a similar manner to the case where a vibration with a single vibrational frequency has been considered.

The calculating unit 18 creates a pulse sequence signal PS based on N set as described above and supplies the pulse sequence signal PS to the optical modulator 3.

Second Embodiment

In the method according to the first embodiment, the phase value θ (z, $mT_N+2z/v$) at a measurement time point $mT_N+2z/v$ of a scattered light vector having been scattered at a point of a distance z from an incidence end is calculated as represented by expression (1-3) using i and n that satisfy $mT_N+2z/v=iT_N+nNT_N+2z/v$. Since m=i+nN on the right side of expression (1-3), hereinafter, i and n will be described as i(m) and n(m) in order to explicitly show that i and n are dependent on m. Using expression (1-3), an amount of phase change from the time point $mT_N+2z/v$ to a time point $m'T_N+2z/v$ is calculated as

[Math. 2-1]

$$\theta\left(z, m'T_N + \frac{2z}{v}\right) - \theta\left(z, mT_N + \frac{2z}{v}\right) \quad (2\text{-}1)$$

-continued $$= \theta_{i(m')}\left(i(m')T_N + n(m')NT_N + \frac{2z}{v}\right)$$

$$-\theta_{i(m)}\left(i(m)T_N + n(m)NT_N + \frac{2z}{v}\right)$$

When optical frequencies represented by i(m) and i(m') differ from each other, expression (2-1) represents an addition of an angle difference between different optical frequencies to an actual amount of phase change. In other words, when the actual amount of phase change is represented by Δθ and the angle difference between different optical frequencies is represented by Φ(i(m'), i(m)), the following is arrived at.

[Math. 2-2]

$$\theta\left(z, m'T_N + \frac{2z}{v}\right) - \theta\left(z, mT_N + \frac{2z}{v}\right) = \Delta\theta + \phi(i(m'), i(m)) \quad (2\text{-}2)$$

Figure 2:
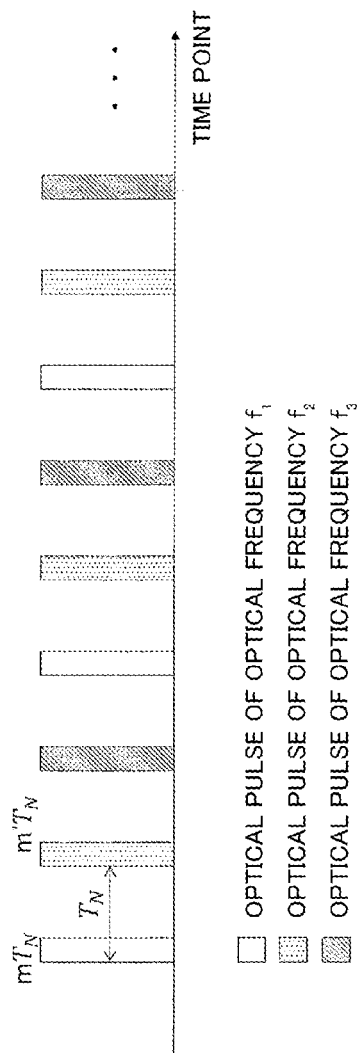
FIG. 2 is a diagram for describing an optical pulse sequence to be input to a measured optical fiber from the optical pulse test equipment according to the present invention.
Figure 3:
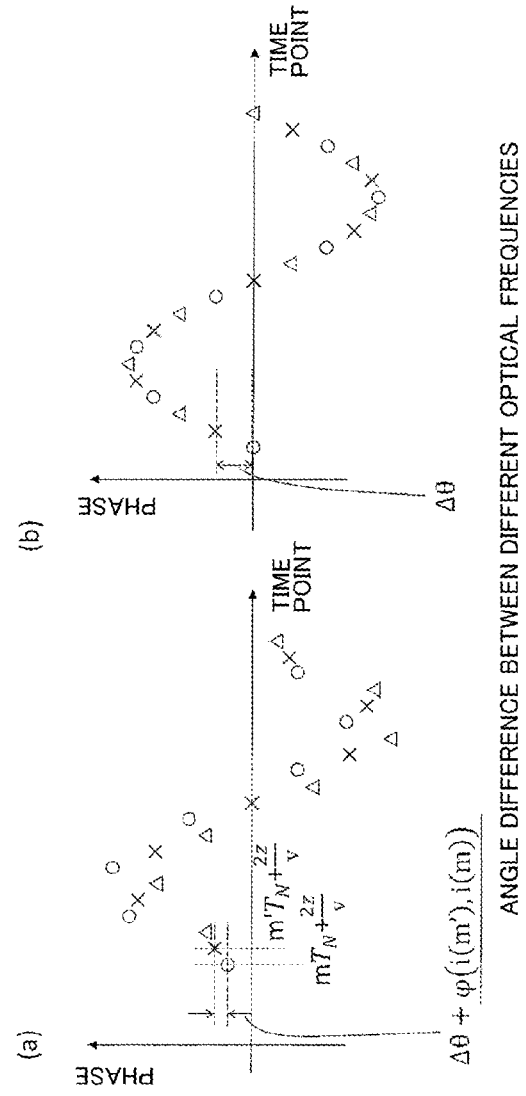
FIG. 3 is a diagram for describing a phase change at a position z of a measured optical fiber as measured by the optical pulse test equipment according to the present invention. (a) represents an actually measured value. (b) represents a result of correcting an angle difference between different optical frequencies. Symbols (o, x, Δ) of plots correspond to optical frequencies of optical pulses. In other words, plots assigned same symbols represent phases measured with optical pulses having a same optical frequency.

As is apparent from expression (2-2), due to the presence of the angle difference Φ(i(m'), i(m)) between different frequencies, a measured waveform of the phase change ends up being different from a waveform representing the actual phase change. This situation is shown in FIGS. 2 and 3. FIGS. 2 and 3 represent an example of measuring a sinusoidal vibration with the number of multiplexes 3. FIG. 2 represents an incident optical pulse sequence having been frequency-multiplexed according to the method described in the first embodiment. FIG. 3(a) shows a phase measured at a position of a distance z from an incidence end.

In the present embodiment, a method of arranging frequency-multiplexed pulses and a signal processing method for correcting the angle difference Φ(i(m'), i(m)) between different optical frequencies will be described. A phase when the angle difference between different optical frequencies is corrected becomes as shown in FIG. 3(b) and enables an actual phase change to be correctly measured.

In order to correct the angle difference between different optical frequencies, the light source inputs, before inputting the optical pulse sequence to the one end of the measured optical fiber, a correction optical pulse sequence in which are arranged optical pulse pairs in which the optical pulses with different optical frequencies are arranged at shorter intervals than the optical pulse intervals of the optical pulse sequence to the one end of the measured optical fiber, and the signal processing unit calculates a correction value of the phase component of the scattered light by Math. C2.

Figure 22:
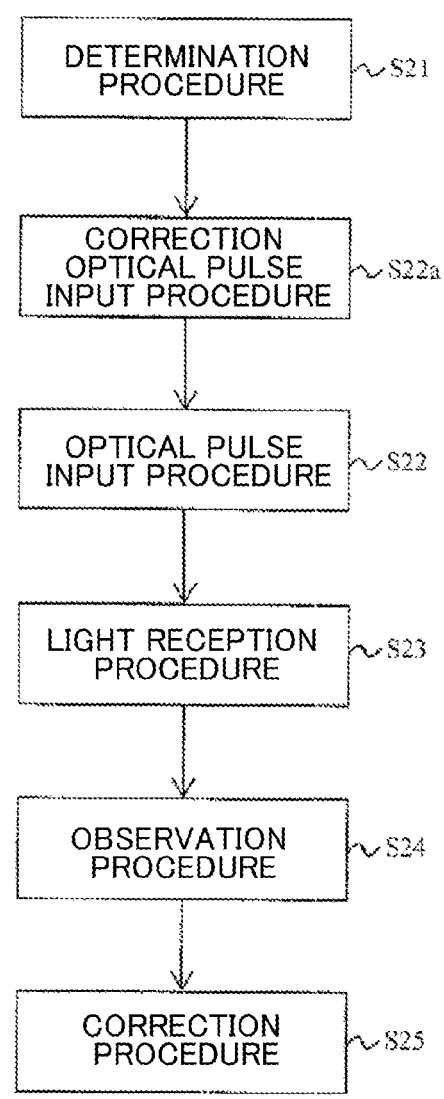
FIG. 22 is a flow chart for describing the optical pulse test method according to the present invention.

FIG. 22 is a diagram for describing an optical pulse test method to be performed by the present vibration detection equipment. The present optical pulse test method includes, in addition to the optical pulse test method shown in FIG. 1: inputting, before inputting the optical pulse sequence to the one end of the measured optical fiber 6, a correction optical pulse sequence in which optical pulse pairs in which the optical pulses with different optical frequencies are arranged at shorter intervals than the optical pulse intervals of the optical pulse sequence are arranged to the one end of the measured optical fiber 6 (step S22a); and calculating a correction value of the phase component of the scattered light by Math. C2 (step S25).

A detailed description will be given below.

Figure 4:
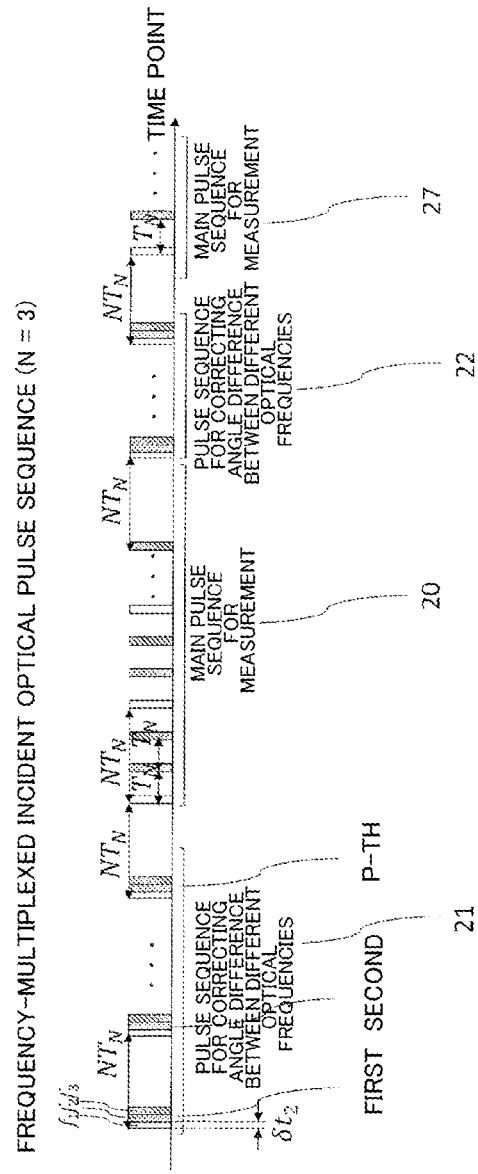
FIG. 4 is a diagram for describing an optical pulse sequence to be input to a measured optical fiber from the optical pulse test equipment according to the present invention.

The angle difference between different optical frequencies can be calculated by: arranging different optical frequencies at time intervals that enable a state change in an optical fiber due to a vibration to be ignored and inputting the arranged optical frequencies to a measured optical fiber; and processing a signal thereof. While the time interval between minute pulses that enable a state change in the optical fiber to be ignored is dependent on the vibrational frequency fv and a magnitude of the vibration, normally, a time interval of around several ns is sufficient. Therefore, as shown in FIG. 4, as an optical frequency-multiplexed pulse in which pulses of all optical frequencies to be used are arranged at time intervals that enable a state change in the fiber due to a vibration to be ignored which differs from a main pulse sequence (such as 20) for measurement described in the first embodiment, a pulse sequence 21 for angle difference correction in which different optical frequencies are arranged at a repetition interval of $NT_N$ is input. The repetition interval for the pulse sequence 21 is set to $NT_N$ because a time interval of pulses with a same optical frequency must be equal to or longer than 2z/v.

Let us assume that the number of frequency-multiplexed pulses that constitute the pulse sequence 21 is P. When a time point of incidence of a head of a p-th (where p is an integer from 1 to P) frequency-multiplexed pulse is represented by $t_p$, a time point at which a pulse of each optical frequency component $f_i$ is input is represented by $t_p + \delta t_i$. $\delta t_i$ denotes a time difference between the head of the frequency-multiplexed pulse and the head of the pulse of each optical frequency component and is known at the time of design. When a reciprocating time of an optical pulse of each optical frequency component is taken into consideration, a complex vector of scattered light from a point at a distance z from the incidence end is observed at a measurement time point $t_p + 2z/v + \delta t_i$. A scattered light vector at the measurement time point $t_p + 2z/v + \delta t_i$ of each optical frequency pulse will simply be described as $r_i(z, t_p + 2z/v)$. The angle difference Φ(i(m'), i(m)) between different optical frequencies is calculated as follows.

[Math. 2-3]

$$\phi(i(m'), i(m)) = \arg\left[\frac{1}{P}\sum_{p=1}^{P} R[\arg\{r_{i(m)}(z, t_p + 2z/v)\}]r_{i(m')}(z, t_p + 2z/v)\right] \quad (2\text{-}3)$$

where an arg function represents a function which calculates a deflection angle of a complex vector of an argument within a range from −π to π and which outputs a real number, and R(*) represents an operator which acts on a complex vector r and which rotates the complex vector clockwise by an angle * on a complex plane.

Expression (2-3) uses a similar principle to "first vector rotation procedure" described in "Appendix", and the angle difference between different optical frequencies is calculated as "a rotation angle of a wavelength of i(m') when i(m) is assumed to represent a reference wavelength" in "first vector rotation procedure" (however, positive and negative signs are reversed). Expression (2-3) corresponds to expressions (11) to (13) in "Appendix".

Since the angle difference Φ(i(m'), i(m)) is dependent on z but not dependent on the measurement time point with the exception of an effect of a frequency drift or the like of a laser, when frequencies corresponding to i(m') and i(m) are the same, the angle difference Φ(i(m'), i(m)) need not be individually calculated for m' and m. For example, when the frequencies corresponding to i(2) and i(1) are $f_1$ and $f_2$, by calculating an angle difference Φ(i(2), i(1)) using expression (2-3), a value of Φ(i(2), i(1)) can be used as an angle difference Φ(i(5), i(4)) when the frequencies corresponding to i(5) and i(4) are $f_1$ and $f_2$. In other words, since only the frequencies matter, Φ(i(m'), i(m))=Φ($f_{i(m')}$, $f_{i(m)}$) is true.

In expression (2-3), taking advantage of the fact that a difference itself between angles of complex vectors of respective optical frequencies is constant excluding noise, complex vectors at a plurality of time points are averaged to reduce an effect of noise when calculating Φ(i(m'), i(m)). In particular, rotating a complex vector using the complex vector rotation operator R(*) enables noise to be reduced in an efficient manner.

According to expression (2-2), the actual phase change Δθ can be calculated using the angle difference Φ(i(m'), i(m)) between different optical frequencies calculated in expression (2-3) as

[Math. 2-4]

$$\Delta\theta = \theta\left(z, m'T_N + \frac{2z}{v}\right) - \theta\left(z, mT_N + \frac{2z}{v}\right) - \phi(i(m'), i(m)) \quad (2\text{-}4)$$

Specifically, as procedures of signal processing, θ (z, $mT_N$+ 2z/v) is calculated using the method described in the first embodiment with respect to a signal acquired by a measurement main pulse sequence (such as 20), the angle difference Φ(i(m'), i(m)) between different optical frequencies is calculated based on expression (2-3) from a signal acquired by pulse sequences for angle difference correction with different optical frequencies, and the actual amount of phase change Δθ is calculated based on expression (2-4) using the calculated values.

It should be noted that the number of frequency-multiplexed pulses P that constitute the pulse sequence 21 is designed based on an accuracy required by the angle difference Φ(i(m'), i(m)) calculated using expression (2-3). Since the larger the number P, the longer a time slot that cannot be measured at a sampling interval $T_N$ necessary for monitoring a vibration that is a measurement object, the number P is set to a minimum necessary value.

An accuracy ±ξ of the angle difference Φ(i(m'), i(m)) necessary for measuring a vibration that is a measurement object is determined in advance. For example, when the angle difference Φ(i(m'), i(m)) is calculated using a value that differs from a true value by +ξ, time variations of phases between other time points that correspond to optical frequencies of a same combination as the optical frequencies of i(m') and i(m) will also be measured as being distorted from actual phase changes by +ξ. Therefore, an allowable calculation accuracy ±ξ is estimated based on preliminary information such as a magnitude and a waveform of a vibration that is a measurement object.

Figure 5:
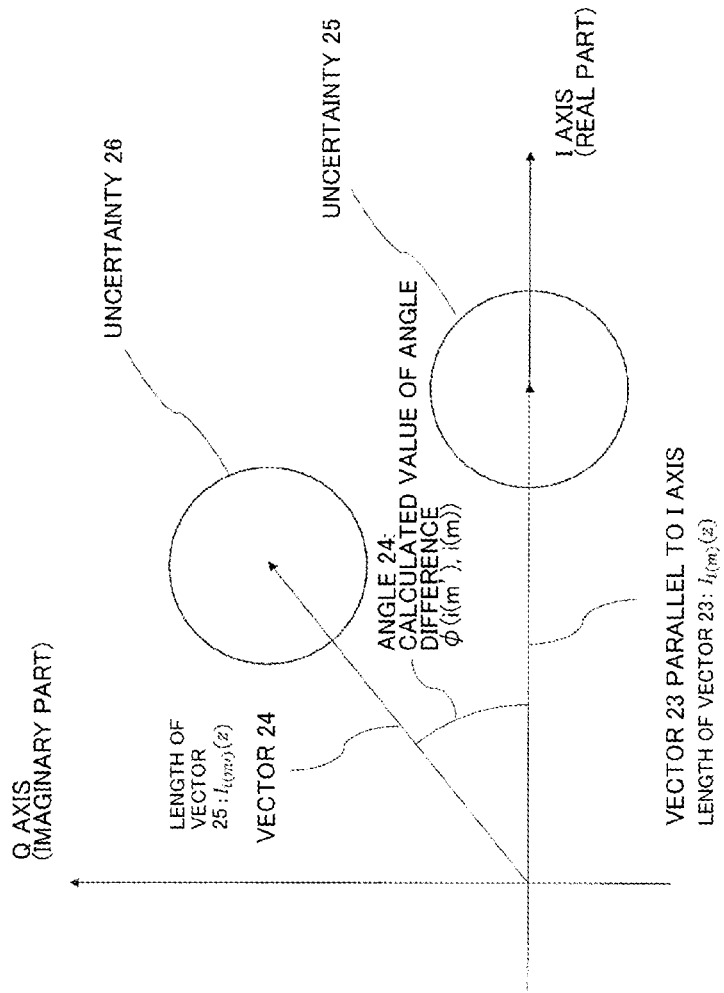
FIG. 5 is a diagram describing an angle difference between different optical frequencies.

On the other hand, a relational expression of an accuracy ±δΦ of the angle difference Φ(i(m'), i(m)) calculated using the number of frequency-multiplexed pulses P and expression (2-3) can be derived as follows. First, due to fading, since a variation occurs in $|r_{i(m')}|$ and $|r_{i(m)}|$ which represent a magnitude of a scattered light vector of each optical frequency corresponding to a magnitude of an amplitude of scattered light depending on a specific value of a distance z from the incidence end, the accuracy ±δΦ is also changed by the distance z. Therefore, for the purpose of setting the number P in advance, respective statistical average values of $|r_{i(m')}|$ and $|r_{i(m)}|$ is used to derive a relationship between the number P and a statistical average value of the accuracy ±δΦ. In addition, in expression (2-3), although an average of different time points $t_p$+2z/v (p=1, ..., P) is calculated and, therefore, $|r_{i(m')}|$ and $|r_{i(m)}|$ at different time points affect a calculation result, since the values temporally change when a vibration occurs in the optical fiber during incidence of the pulse sequence 21, the accuracy ±δΦ of the angle difference Φ(i(m'), i(m)) as a calculation result also changes. Therefore, while the accuracy ±δΦ of the angle difference Φ(i(m'), i(m)) is dependent on a time variation of $|r_{i(m')}|$ and $|r_{i(m)}|$ due to a vibration, since it is difficult to take a change due to a vibration into consideration when setting the number P in advance, in this case, it is assumed that there is no time variation of $|r_{i(m')}|$ and $|r_{i(m)}|$ for the purpose of setting the number P in advance. Let respective statistical average values of $|r_{i(m')}|$ and $|r_{i(m)}|$ be represented by $I_{i(m')}$ (z) and $I_{i(m)}$ (z). For example, these values can be acquired by a method such as calculating the values from incidence light intensity and a propagation loss value of the optical fiber and evaluating the values or measuring a light intensity loss distribution of a measured optical fiber in advance using an OTDR equipment that uses a portable laser light source of which light intensity loss can be measured and of which coherence is poor. With the latter method, purposely using a laser light source with poor coherence enables a statistical average value of light intensity loss to be measured. Using obtained $I_{i(m')}$ (z) and $I_{i(m)}$ (z), a vector 23 and a vector 25 on an IQ plane shown in FIG. 5 are created. The vector 23 is assumed to be a vector which is parallel to an I axis and of which a length is $I_{i(m)}$ (z). The vector 24 has a counterclockwise angle with respect to the I axis by the angle difference Φ(i(m'), i(m)) calculated using expression (2-3) and has a length of $I_{i(m')}$ (z).

The vector 23 and the vector 24 are considered to have uncertainty 25 and uncertainty 26 which are attributable to noise that combines a shot noise during a measurement, a thermal noise of a PD, a noise in a subsequent electric circuit, and the like. A magnitude of uncertainty during a single-shot measurement will be described "Noise" as a radius of a circle of uncertainty. Since a Noise value is solely determined by performance of a measuring instrument, the Noise value can be measured in advance. Since a time interval of a frequency-multiplexed pulse is $NT_N$ that is sufficiently longer than an impulse response of PD or the like and noises of different time points $t_p$+2z/v can be considered as being uncorrelated and random, magnitudes of the uncertainty 25 and the uncertainty 26 can be expressed as the radius of a circle of uncertainty using the number P of frequency-multiplexed pulses as Noise/√P. Therefore, a statistical average value of ±δΦ can be approximated as

[Math. 2-5]

$$\delta\phi = \sqrt{\text{Arcsin}^2\left(\frac{\text{Noise}}{I_{i(m')}(z) \cdot \sqrt{P}}\right) + \text{Arcsin}^2\left(\frac{\text{Noise}}{I_{i(m)}(z) \cdot \sqrt{P}}\right)} \quad (2\text{-}5)$$

Since expression (2-5) represents a decreasing function about P, a minimum P satisfying δΦ≤ξ may be set.

To summarize specific procedures, the accuracy ±ξ of the angle difference Φ(i(m'), i(m)) necessary for measuring a vibration that is a measurement object is determined based on preliminary information such as a magnitude and a waveform on the vibration that is a measurement object, $I_{i(m')}$ (z) and $I_{i(m)}$ (z) that are an average of a magnitude of an amplitude of scattered light and a magnitude Noise of noise are evaluated, measured, and substituted into expression (2-5) to obtain a relational expression between δΦ and P, and a minimum P satisfying δΦ≤ξ is finally calculated and set as the number of the frequency-multiplexed pulses of the pulse sequence 21 shown in FIG. 4.

Since the calculation described above is performed using $I_{i(m')}(z)$ and $I_{i(m)}(z)$ that are proportional to an average magnitude of an amplitude of scattered light, points that statistically satisfy δΦ≤ξ make up 50% of all points. When this condition needs to be made more severe so that more points satisfy δΦ≤ξ, the calculation can also be performed based on a smaller numerical value than the average magnitude of the amplitude of scattered light. In addition, when a particular location to be measured can be specified based on a distance z from the incidence end, $|I_{i(m')}(z)|$ and $|I_{i(m)}(z)|$ at the location can be measured in advance and the values can be used instead of $I_{i(m')}(z)$ and $I_{i(m)}(z)$ to derive an expression similar to expression (2-5) to determine the number P.

In addition, although expression (2-5) has been derived on the assumption that there is no time variation of $|I_{i(m')}(z)|$ and $|I_{i(m)}(z)|$ when a vibration occurs in the optical fiber during incidence of the pulse sequence 21, when information related to the time variation of $|I_{i(m')}(z)|$ and $|I_{i(m)}(z)|$ due to a vibration occurring in the optical fiber during incidence of the pulse sequence 21 may be obtained in advance, such information can also be incorporated into the calculation.

When an absolute value of each optical frequency changes due to a frequency drift of a laser, the angle difference Φ(i(m'), i(m)) also changes. As a preventive measure, as indicated by the pulse sequences 21 and 22 in FIG. 4, a value of the angle difference Φ(i(m'), i(m)) is updated by regularly inserting a pulse sequence for correcting an angle difference between different optical frequencies. In the case of the example shown in FIG. 4, an angle difference between different optical frequencies is acquired with the pulse sequence 21, a phase measured with the pulse sequence 20 is corrected using the value of the angle difference, an angle difference between the different optical frequencies is once again acquired with the pulse sequence 22, and a phase measured with a pulse sequence 27 is corrected using the value of the angle difference. A time interval for inserting a pulse sequence for correction (for example, an interval between the pulse sequence 21 and the pulse sequence 22 in the example shown in FIG. 4) is determined based on characteristics of the frequency drift of the laser. Qualitatively, when a degree of frequency drift is large, the time interval for inserting pulse sequences for correcting an angle difference between different optical frequencies is set short.

Using the method according to the present embodiment enables a waveform distortion due to an angle difference between different optical frequencies that occurs in the first embodiment to be corrected. On the other hand, with the method according to the present embodiment, the fact that time slots of the pulse sequences 21 and 22 which must be measured at a time interval of $NT_N$ are created presents a disadvantage as compared to the first embodiment where measurements can always be performed at a time interval $T_N$. Therefore, embodiments should be used selectively such as using the first embodiment when prioritizing always performing measurements at the time internal $T_N$ but using the present embodiment when prioritizing performing vibration measurements while minimizing waveform distortion.

Third Embodiment

The first embodiment and the second embodiment are related to methods of solving the trade-off between a measurement distance and an upper limit of a measurable vibrational frequency by improving the number of sampling points by frequency multiplexing. In the present embodiment, a method of frequency multiplexing for simultaneously solving the trade-off between a measurement distance and an upper limit of a measurable vibrational frequency and solving an occurrence of points where phase detection cannot be performed due to fading will be described. Specifically, the present embodiment relates to a configuration method of a frequency-multiplexed pulse sequence and a method of signal processing.

The number of multiplexes N necessary for solving the trade-off between a measurement distance and an upper limit of a measurable vibrational frequency is determined from characteristics and the like of a vibration to be a measurement object. A method of determining the number of multiplexes N is similar to that of the first embodiment. In addition, the number of multiplexes M necessary for an anti-fading measure is determined. A method of determining the number of multiplexes M is as described in "Appendix". That is, the number M of the minute optical pulses is set so that a multiple of a noise level by $1/\sqrt{M}$ is equal to or smaller than a predetermined value (a value set in accordance with a type of the measured optical fiber, a mode of the vibration that is a measurement object, performance of the optical pulse test equipment, or the like).

Figure 6:
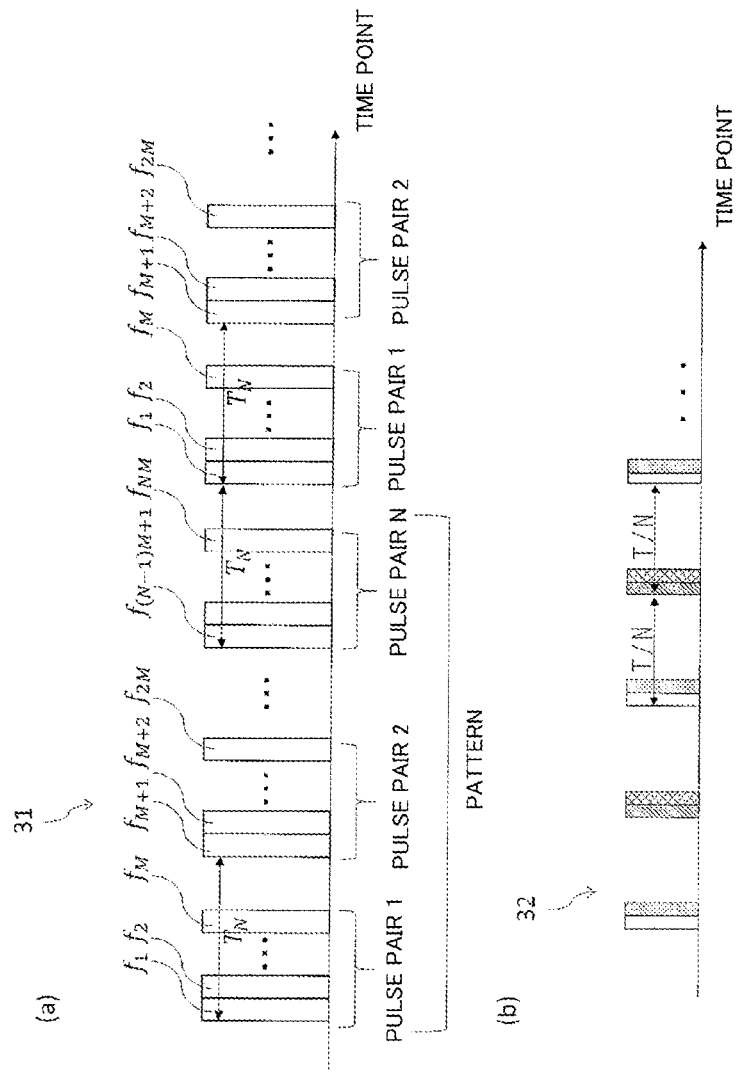
FIG. 6 is a diagram for describing an optical pulse sequence to be input to a measured optical fiber from the optical pulse test equipment according to the present invention.

Based on the determined number of multiplexes N and the determined number of multiplexes M, a pulse sequence 31 shown in FIG. 6 is input to the measured optical fiber as a frequency-multiplexed pulse sequence. Input methods and the like are similar to those in FIG. 1 described in the first embodiment, and the modulator 3 is operated so as to create pulses shown in FIG. 6.

The pulse sequence 31 represents a pattern made up of N-number of different pulse pairs being repeated during a measurement time. An interval of adjacent pulse pairs is set to $T_N$, and a state of a fiber at a different time point is measured from a signal obtained by inputting the respective pulse pairs. Each pulse pair is constituted by M-number of different optical frequency pulses. The time interval of the M-number of different optical frequency pulses is set small enough to enable a state change in an optical fiber due to a vibration to be ignored. Therefore, since it can be considered that a state of an optical fiber at a same time point is being measured using signals created by M-number of optical frequency pulses, an anti-fading measure is performed using the M-number of signals. A pulse sequence 32 represents an example in which N is 2 and M is 2.

Specific procedures of signal processing will now be described. Let a time point of incidence of a head of a pulse pair i be represented by $i \times T_N + nNT_N$ (where n is any integer). By adopting an optical frequency of the head of each pulse pair as a reference wavelength and averaging signals of the M-number of different optical frequencies that constitute the pulse pair according to the method described in "Appendix", a phase $\theta_i(iT_N + nT_N + 2z/v)$ of a scattered light vector having been scattered at a position of a distance z from the incidence end is calculated. In addition, by changing i in expression (1-3) in the first embodiment from a frequency number to a pulse pair number, $\theta(z, mT_N + 2z/v)$ is calculated in a similar manner to the first embodiment.

Fourth Embodiment

The third embodiment is a generalization to a case where an anti-fading measure is performed in the first embodiment. The first embodiment is arrived at by setting M=1 in the third embodiment. Therefore, a problem in the first embodiment in that the angle difference $\Phi(i(m'), i(m))$ between different optical frequencies has not been corrected and distorts waveform similarly occurs in the third embodiment. In the present embodiment, the waveform distortion created in the third embodiment is corrected by generalizing the method of correcting an angle difference between different optical frequencies described in the second embodiment. Specifically, the present embodiment relates to a configuration method of a frequency-multiplexed pulse sequence and a method of signal processing.

Figure 7:
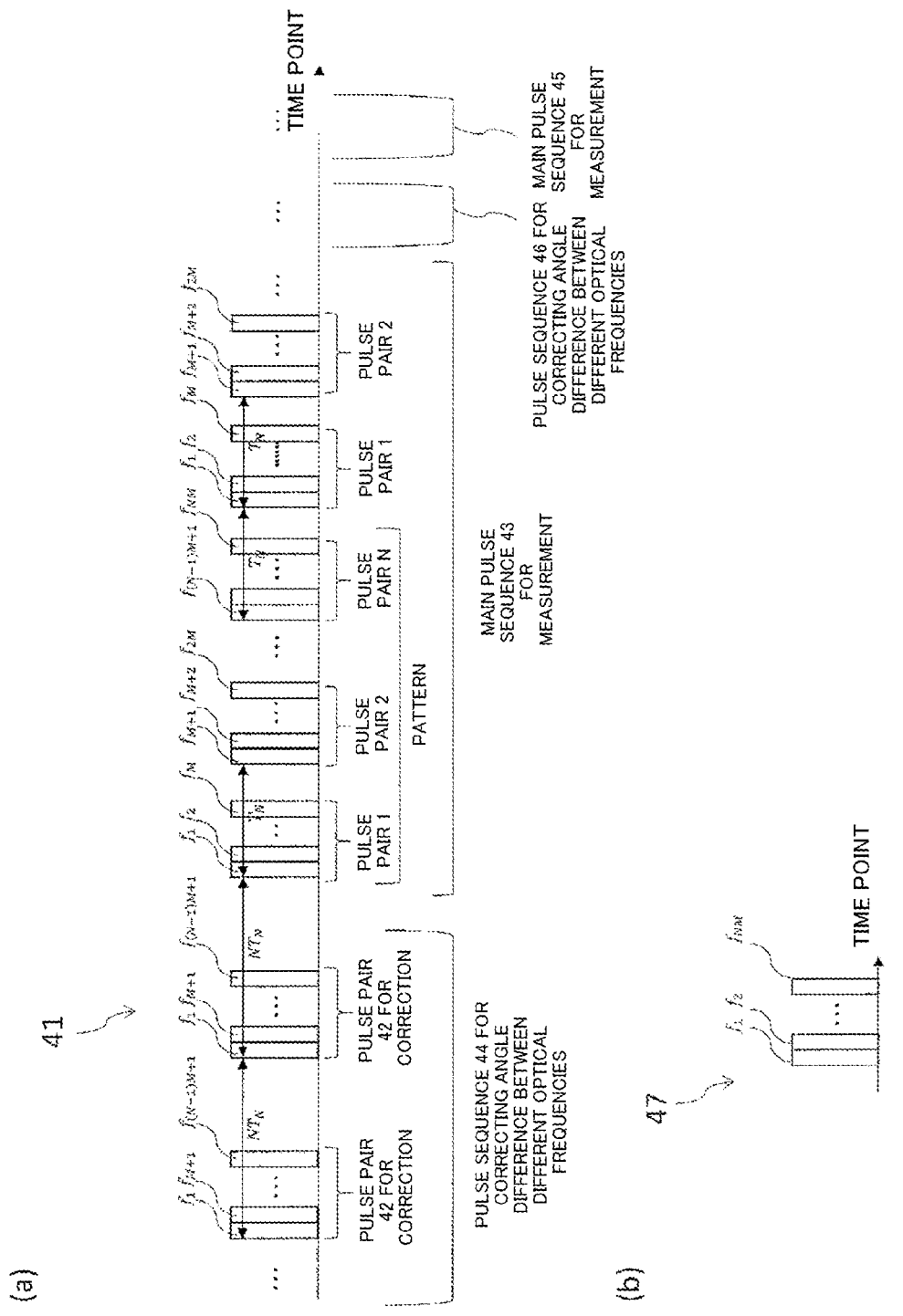
FIG. 7 is a diagram for describing an optical pulse sequence to be input to a measured optical fiber from the optical pulse test equipment according to the present invention.

A pulse sequence 41 shown in FIG. 7(a) is input to the measured optical fiber as a frequency-multiplexed pulse sequence. Input methods and the like are similar to those in FIG. 1 described in the first embodiment, and the modulator 3 is operated so as to create pulses shown in FIG. 7(a).

The pulse sequence 41 is created by regularly inserting a pulse sequence 44 or 46 for correcting an angle difference between different optical frequencies between the measurement main pulse sequences 43 and 45 described in the third embodiment. The pulse sequences 44 and 46 for correcting an angle difference between different optical frequencies are assumed to be pulse sequences in which P-number of correction pulse pairs 42 are arranged at repetition intervals $NT_N$. The correction pulse pairs 42 are configured such that pulses of an optical frequency $f_1, f_{(M+1)}, \ldots, f_{((N-1)M+1)}$ of a head of each pulse pair of the measurement main pulse sequence 43 (same as the pulse sequence 31 in FIG. 6) are arranged at time intervals that enable a state change in the fiber due to a vibration to be ignored.

The measurement main pulse sequence 43 is input and a phase $\theta (z, mT_N+2z/v)$ is obtained by the method described in the third embodiment. However, since a measured waveform of the phase change has the angle difference $\Phi(i(m'), i(m))$ between different optical frequencies in a similar manner to expression (2-2) according to the second embodiment, the measured waveform ends up being different from a waveform representing the actual phase change. However, in the case of the present embodiment, the angle difference $\Phi(i(m'), i(m))$ corresponds to an angle difference between the frequency of a head of a pulse pair corresponding to $i(m')$ and the frequency of a head of a pulse pair corresponding to $i(m)$. The angle difference $\Phi(i(m'), i(m))$ can be calculated using expression (2-3) using measurement data of the pulse sequence 44. The calculated phase $\theta (z, mT_N+2z/v)$ and the angle difference $\Phi(i(m'), i(m))$ are substituted into expression (2-4) and a phase in which an angle difference between different optical frequencies has been corrected is calculated.

It should be noted that a correction pulse pair 47 shown in FIG. 7(b) may be used in place of the correction pulse pair 42. The correction pulse pair 47 is constructed by arranging pulses of all optical frequencies at time intervals that enable a state change in the measured optical fiber due to a vibration to be ignored. Even using the pulse pair 47, the angle difference $\Phi(i(m'), i(m))$ can be calculated in a similar manner to the method described above. A difference from using the correction pulse pair 42 is that, since the number of frequencies constituting the correction pulse pair 47 is M-times that of the correction pulse pair 42 and the number of optical frequencies to spare for an anti-fading measure increases despite an increase in calculation time, the time variation of a phase measured with the pulse sequence 44 can now be measured with higher sensitivity. As far as whether to use the correction pulse pair 42 or the correction pulse pair 47, the correction pulse pair 47 is selected when the time variation of the phase to be measured with the pulse sequence 44 is to be calculated with higher sensitivity even if a longer calculation time is required while the correction pulse pair 42 is used when trying to reduce the calculation time as much as possible, when a measurement of the phase change need not be performed during a time slot in which the pulse sequence 44 is input, and the like.

The number P of the pulse pairs 42 (or the pulse pairs 47) that constitute the pulse sequence 44 for correcting the angle difference between different optical frequencies is set in a similar manner to the second embodiment.

In addition, as a countermeasure to a frequency drift of a laser, a pulse sequence for correcting the angle difference between different optical frequencies is regularly inserted and the angle difference $\Phi(i(m'), i(m))$ is regularly updated and used to deal with the frequency drift in a similar manner to the second embodiment. In the case of the example of the pulse sequence 41 shown in FIG. 7(a), a calculation result of the pulse sequence 44 is used to correct the phase calculated with the pulse sequence 43 and a calculation result of the pulse sequence 46 is used to correct the phase calculated with the pulse sequence 45. A time interval (for example, a time between the sequences 44 and 46) at which a pulse sequence for correcting the angle difference between different optical frequencies is inserted is determined in a similar manner to the second embodiment.

Fifth Embodiment

In the fourth embodiment, during a time slot in which the pulse sequence 44 or a pulse sequence 47 for correcting the angle difference between different optical frequencies is being input, a time interval of measuring a time variation of a phase ends up being $NT_N$. In the present embodiment, a method will be described in which the time variation of a phase is measured at the time interval $T_N$ in all time slots by simply increasing the number of optical frequencies to be used by one as compared to the case of the fourth embodiment regardless of the values of the numbers of multiplexes N and M. Specifically, the present embodiment relates to a configuration method of a frequency-multiplexed pulse sequence and a method of signal processing.

While a variety of specific configuration methods of a pulse sequence to be used is conceivable, three roughly-divided configuration methods will be demonstrated in the present embodiment. The three configuration methods will be distinguished from one another as a configuration method A, a configuration method B, and a configuration method C.

[Configuration Method A]

First, the simplest configuration method A will be described together with a method of signal processing.

Figure 8:
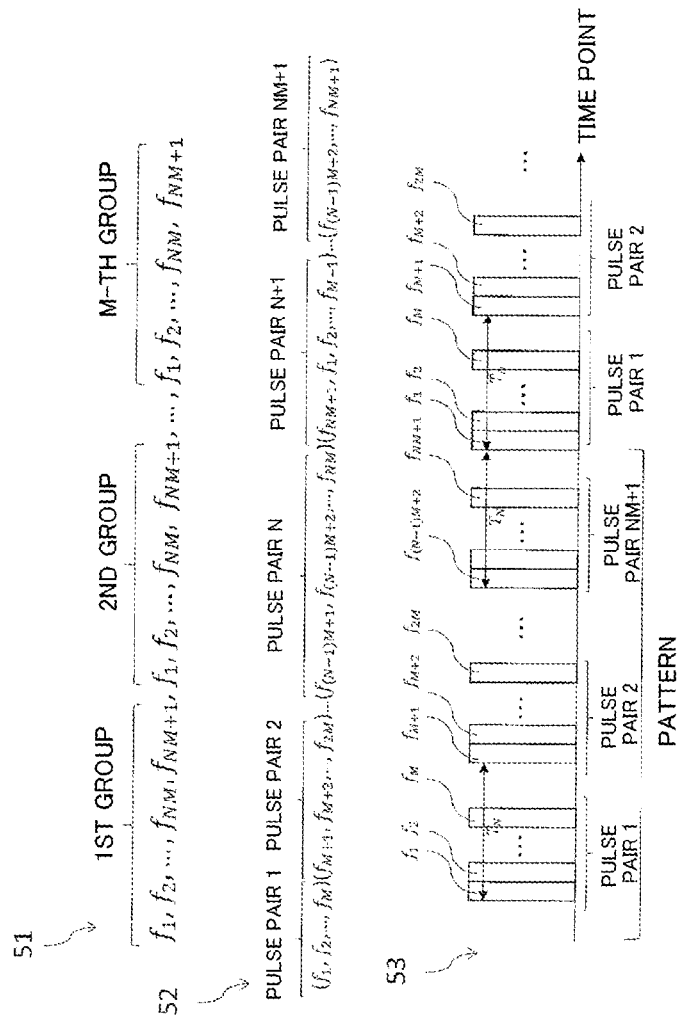
FIG. 8 is a diagram for describing an optical pulse sequence to be input to a measured optical fiber from the optical pulse test equipment according to the present invention.

Frequencies with frequency numbers 1 to NM+1 are arranged in this order from the left. Once the frequencies have been arranged, on a right side of the arranged frequencies, the frequencies with the frequency numbers 1 to NM+1 are once again arranged in this order from the left. This operation is repeated M-number of times to create a frequency number sequence 51 such as that shown in FIG. 8. M-number of frequencies from the leftmost frequency of the frequency number sequence 51 are selected as a combination of frequencies to be used by the pulse pair 1. M-number of frequencies from the right of the M-number of selected frequencies is selected as a combination of frequencies to be used by the pulse pair 2. This operation is repeated to determine combinations of frequencies to be used by NM+1-number of pulse pairs such as those shown in a pulse pair combination 52. The NM+1-number of pulse pairs are used to create an incident pulse such as a pulse sequence 53. The pulse sequence 53 is constructed by repeating, for a measurement time, a single pattern in which the NM+1-number of pulse pairs are arranged at intervals of $T_N$.

By processing a signal obtained by the incident pulse sequence 53 as follows, a phase measured at a time interval $T_N$ in all time slots in which angle differences between different optical frequencies have been corrected is calculated.

Let a time point of incidence of a head of a pulse pair i be represented by $i \times T_N + n \times N \times T_N$ (where n is any integer). In a similar manner to the third embodiment, by adopting a frequency of the head of each pulse pair as a reference wavelength and averaging signals of the M-number of different optical frequencies that constitute the pulse pair according to the method described in "Appendix", a phase $\theta_i$ ($iT_N + nNT_N + 2z/v$) at a position of a distance z from the incidence end is calculated. In addition, by changing i in expression (1-3) in the first embodiment from a frequency number to a pulse pair number, a phase $\theta$ (z, $mT_N + 2z/v$) is calculated in a similar manner to the first embodiment.

The phase $\theta$ (z, $mT_N + 2z/v$) includes an angle difference between different optical frequencies in a similar manner to the description given at the beginning of the fourth embodiment. While performing correction of angle differences between different optical frequencies without omission requires performing correction of an angle difference between optical frequencies of heads of any two pulse pairs, being able to correct an angle difference between the optical frequencies of heads of adjacent pulse pairs will suffice. This is because an angle difference $\Phi(f_i, f_j)$ between arbitrary optical frequencies $f_i$ and $f_j$ can be described using another arbitrary optical frequency $f_k$ as follows.

[Math. 5-1]

$$\Phi(f_i, f_j) = \Phi(f_i, f_k) + \Phi(f_k, f_j) \quad (5\text{-}1)$$

where i, j, and k are any positive integer.

Using this expression, when the positive integers i and j satisfying i<j are arbitrary selected, having $f_j^{pf}$ represent an optical frequency of the head of the pulse pair j and $f_i^{pf}$ represent an optical frequency of the head of the pulse pair i, an angle difference $\Phi(f_j^{pf}, f_i^{pf})$ can be described as a sum of angle differences between the optical frequencies of heads of adjacent pulse pairs as shown below.

[Math. 5-2]

$$\Phi(f_j^{pf}, f_i^{pf}) = \Phi(f_j^{pf}, f_{j-1}^{pf}) + \Phi(f_{j-1}^{pf}, f_{j-2}^{pf}) + \ldots + \Phi(f_{i+1}^{pf}, f_i^{pf}) \quad (5\text{-}2)$$

where i and j are any positive integers and satisfy i<j.

In addition, an angle difference $\Phi(f_{i+1}^{pf}, f_i^{pf})$ (where i is any positive integer) between optical frequencies of heads of any adjacent pulse pairs can be described using an optical frequency $f_i^{pr}$ of a tail end of the pulse pair i as follows.

[Math. 5-3]

$$\Phi(f_{i+1}^{pf}, f_i^{pf}) = \Phi(f_{i+1}^{pf}, f_i^{pr}) + \Phi(f_i^{pr}, f_i^{pf}) \quad (5\text{-}3)$$

The angle difference $\Phi(f_{i+1}^{pf}, f_i^{pr})$ and the angle difference $\Phi(f_i^{pr}, f_i^{pf})$ in expression (5-3) are obtained as follows. First, with respect to the angle difference $\Phi(f_i^{pr}, f_i^{pf})$, since the pulse pair i is repeatedly input, the angle difference $\Phi(f_i^{pr}, f_j^{pf})$ between $f_i^{pr}$ and $f_j^{pf}$ included in the pulse pair i can be calculated using expression (2-3). The number p in expression (2-3) is made to correspond to the pulse pair i having appeared in a p-th incidence within the measurement time. For example, p=1 is made to correspond to a first pulse pair i within the measurement time and p=P is made to correspond to a final pulse pair i within the measurement time. The time point $t_p$ in expression (2-3) represents a time point at which the pulse pair i is input for the p-th time within the measurement time. In addition, with respect to the angle difference $\Phi(f_{i+1}^{pf}, f_i^{pr})$, since the frequency numbers of $f_{i+1}^{pf}$ and $f_i^{pr}$ only differ from each other by 1, there is inevitably one or more pulse pairs including $f_{i+1}^{pf}$ and $f_i^{pr}$. Using expression (2-3) in a similar manner with respect to the pulse pair enables the angle difference $\Phi(f_{i+1}^{pf}, f_i^{pr})$ to be calculated. This demonstrates that the correction of angle differences between different optical frequencies can be performed without omission.

To summarize, the following expression is obtained using expression (5-2) and expression (5-3).

[Math. 5-4]

$$\Phi(f_j^{pf}, f_i^{pf}) = \Phi(f_j^{pr}, f_{j-1}^{pr}) + \Phi(f_{j-1}^{pr}, f_{j-1}^{pf}) + \Phi(f_{j-1}^{pf}, f_{j-2}^{pr}) + \Phi(f_{j-2}^{pr}, f_{j-2}^{pf}) + \ldots + \Phi(f_{i+1}^{pf}, f_i^{pr}) + \Phi(f_i^{pr}, f_i^{pf}) \quad (5\text{-}4)$$

As specific calculation procedures, first, each term of expression (5-4) is calculated using an appropriate pulse pair and using expression (2-3), the angle difference $\Phi(f_j^{pf}, f_i^{pf})$ is next calculated using expression (5-4), and a final phase change is calculated in a similar manner to expression (2-4) using the phase $\theta$ (z, $mT_N + 2z/v$) and the angle difference $\Phi(f_j^{pf}, f_i^{pf})$.

In the description given above, the phase $\theta$ (z, $mT_N + 2z/v$) is calculated based on optical frequencies of heads of respective pulse pairs, and an angle difference is calculated as shown in expression (5-4) using optical frequencies of the head and the tail end of each pulse pair. However, frequencies of the head and the tail end of a pulse pair need not necessarily be used and the phase $\theta$ (z, $mT_N + 2z/v$) can be calculated based on an x-th optical frequency from the head of each pulse pair, and angle difference correction can be performed without omission by creating an expression similar to expression (5-4) using the x-th optical frequency from the head and an y-th optical frequency from the tail end of each pulse pair and calculating an angle difference of each term of a right side of the created expression (however, x and y must be selected such that the x-th optical frequency from the head and the y-th optical frequency from the tail end correspond to different optical frequencies in the same pulse pair). Therefore, even when a failure of an equipment or the like makes it difficult to measure a specific optical frequency, such situations can be accommodated in a flexible manner.

[Configuration Method B]

Next, a configuration method B will be described together with a signal processing method.

Figure 9:
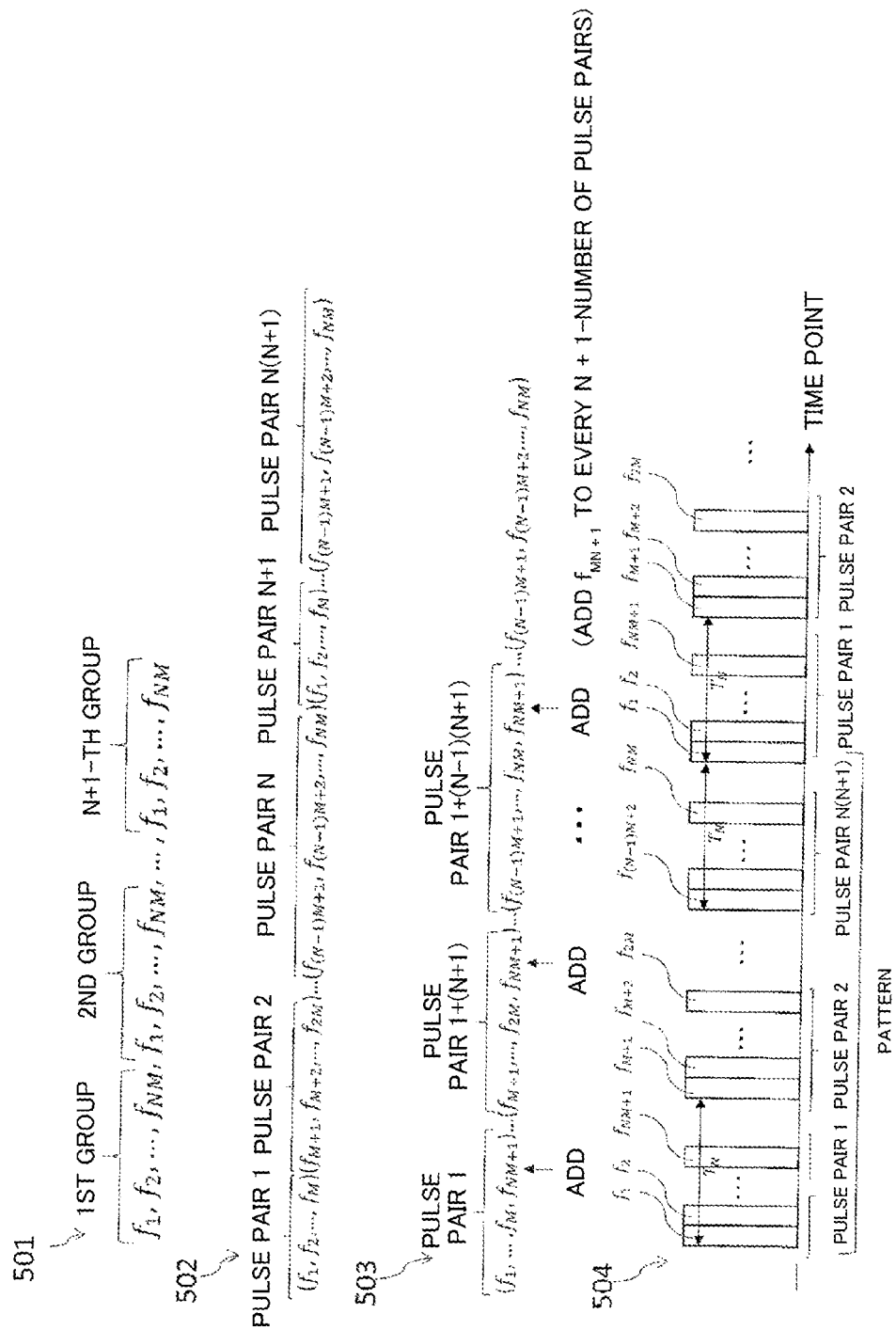
FIG. 9 is a diagram for describing an optical pulse sequence to be input to a measured optical fiber from the optical pulse test equipment according to the present invention.

First, a configuration method of a pulse sequence will be described. Frequencies with frequency numbers 1 to NM are arranged in this order from the left. Once the frequencies have been arranged, on a right side of the arranged frequencies, the frequencies with the frequency numbers 1 to NM are once again arranged in this order from the left. This operation is repeated N+1-number of times to create a frequency number sequence 501 such as that shown in FIG. 9. M-number of frequencies from the leftmost frequency of the frequency number sequence 501 is selected as a combination of frequencies to be used by the pulse pair 1. M-number of frequencies from the right of the M-number of selected frequencies is selected as a combination of frequencies to be used by the pulse pair 2. This operation is repeated to determine combinations of frequencies to be used by N(N+1)-number of pulse pairs such as those shown in a pulse pair combination 502. Next, as shown in a pulse pair frequency combination 503, the frequency $f_{NM+1}$ is added to a pulse pair of which a pulse pair number is 1+k(N+1) (k=0, 1, ..., (N−1)). Accordingly, the number of frequencies that constitute the pulse pair 1+k(N+1) becomes M+1. The N(N+1)-number of pulse pairs are used to create an incident pulse such as a pulse sequence 504. The pulse sequence 504 is constructed by repeating, for a measurement time, a single pattern in which the N(N+1)-number of pulse pairs are arranged so that time intervals of heads are $T_N$.

By processing a signal obtained by the incident pulse sequence 504 as follows, a phase measured at a time interval $T_N$ in all time slots in which angle differences between different optical frequencies have been corrected is calculated.

Let a time point of incidence of a head of a pulse pair i be represented by $i \times T_N + n \times N \times T_N$ (where n is any integer). In a similar manner to the third embodiment, by adopting a frequency of the head of each pulse pair as a reference wavelength and averaging signals of the M-number of different optical frequencies that constitute the pulse pair according to the method described in "Appendix", a phase $\theta_i$ $(iT_N+nNT_N+2z/v)$ at a position of a distance z from the incidence end is calculated. In addition, by changing i in expression (1-3) in the first embodiment from a frequency number to a pulse pair number, a phase $\theta$ $(z, mT_N+2z/v)$ is calculated in a similar manner to the first embodiment.

The phase $\theta$ $(z, mT_N+2z/v)$ includes an angle difference between different optical frequencies in a similar manner to the description given at the beginning of the fourth embodiment. Performing correction of angle differences between different optical frequencies without omission requires performing correction of an angle difference between the optical frequencies of heads of any two pulse pairs. When the positive integers i and j satisfying i<j are arbitrary selected, having $f_j^{pf}$ represent an optical frequency of the head of the pulse pair j and $f_i^{pf}$ represent an optical frequency of the head of the pulse pair i, an angle difference $\Phi(f_j^{pf}, f_i^{pf})$ can be expanded using $f_{NM+1}$ as follows.

[Math. 5-5]

$$\Phi(f_j^{pf}, f_i^{pf}) = \Phi(f_j^{pf}, f_{NM+1}) + \Phi(f_{NM+1}, f_i^{pf}) \quad (5-5)$$

where i and j are any positive integers and satisfy i<j.

In the combination 503 of optical frequencies of pulse pairs that is used in the present embodiment, since the frequency $f_{NM+1}$ has been added to the pulse pair of which a pulse pair number is 1+k(N+1) (k=0, 1, ..., (N−1)), the frequency $f_{NM+1}$ and other frequencies inevitably once exist in a same pulse. Therefore, each term of the right side of expression (5-5) can be calculated using expression (2-3) with respect to a corresponding pulse pair. Using the obtained value of $\Phi(f_j^{pf}, f_i^{pf})$, a final phase is calculated from the phase $\theta$ $(z, mT_N+2z/v)$ in a similar manner to expression (2-4).

In the procedures described above, the phase $\theta$ $(z, mT_N+2z/v)$ is calculated based on frequencies of heads of respective pulse pairs, $\Phi(f_j^{pf}, f_i^{pf})$ is calculated using the frequency of the head of each pulse pair and $f_{NM+1}$, and a final phase is acquired. However, the frequency of the head of each pulse pair need not necessarily be used and an x-th (where x is an integer satisfying 1≤x≤M) frequency from the head may be arbitrarily selected and used. However, due to specifications of a configuration of a pulse sequence, $f_{NM+1}$ must always be used.

A difference between the configuration method B and the configuration method A is that, in the configuration method B, since adding one pulse pair to (N+1)-number of pulse pairs results in the number of included multiplexes becoming M+1, there is an advantage that a phase at a time point being measured with the pulse pair can now be calculated with higher sensitivity due to the number of multiplexes to be used in an anti-fading measure increasing by one. On the other hand, since the configuration method B requires that an angle difference correction between different optical frequencies be performed inevitably using the NM+1-th optical frequency $f_{NM+1}$, there is a disadvantage that angle difference correction of different optical frequencies can no longer be performed when a failure of an equipment or the like makes it difficult to measure the NM+1-th optical frequency. In addition, a difference arises between pattern lengths of the configuration method A and the configuration method B in accordance with the number of multiplexes N and the number of multiplexes M.

[Configuration Method C]

Finally, a configuration method C will be described together with a signal processing method.

Figure 10:
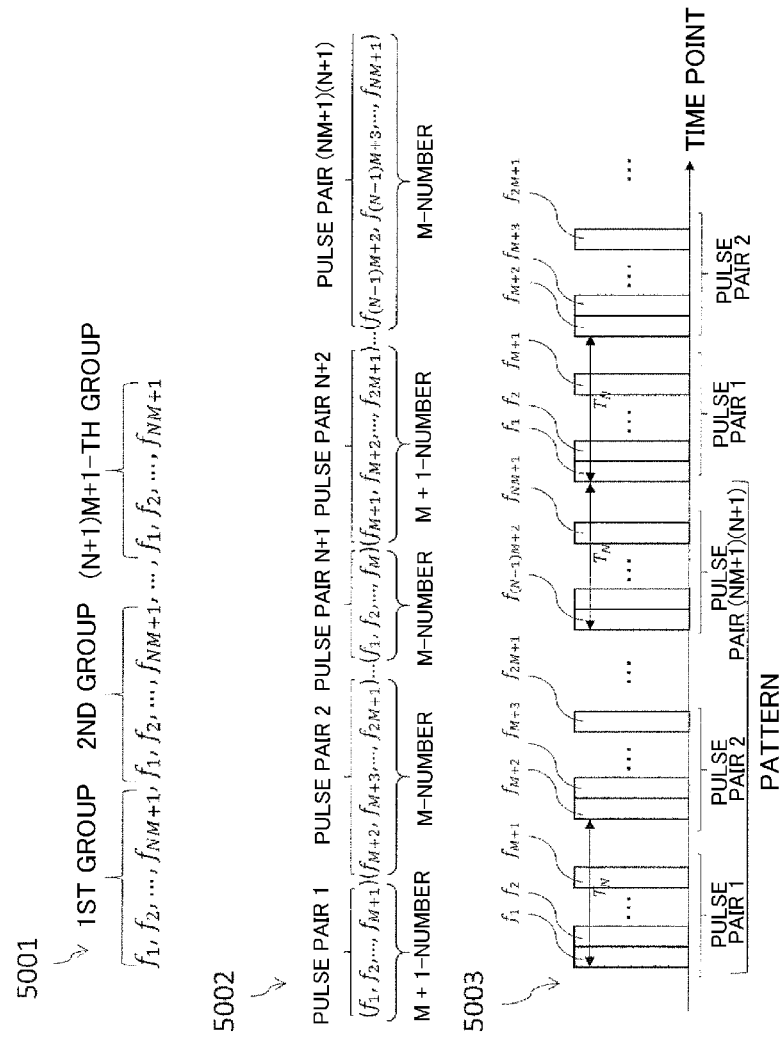
FIG. 10 is a diagram for describing an optical pulse sequence to be input to a measured optical fiber from the optical pulse test equipment according to the present invention.

First, a configuration method of a pulse sequence will be described. Frequencies with frequency numbers 1 to NM+1 are arranged in this order from the left. Once the frequencies have been arranged, on a right side of the arranged frequencies, the frequencies with the frequency numbers 1 to NM+1 are once again arranged in this order from the left. This operation is repeated (N+1)M+1-number of times to create a frequency number sequence 5001 such as that shown in FIG. 10. Next, pulse pairs are created in order from the left such that the number of optical frequencies included in a pulse pair 1+k(N+1) is M+1 and the number of optical frequencies included in other pulse pairs is M (k=0, 1, ...). As a result, a total of (NM+1) (N+1)-number of pulse pairs are created. The (NM+1) (N+1)-number of pulse pairs are used to create an incident pulse such as a pulse sequence 5003. The pulse sequence 5003 is constructed by repeating, for a measurement time, a single pattern in which the (NM+1) (N+1)-number of pulse pairs are arranged so that time intervals of heads are $T_N$.

Let a time point of incidence of a head of a pulse pair i be represented by $i \times T_N + n \times N \times T_N$ (where n is any integer). In a similar manner to the third embodiment, by adopting a frequency of the head of each pulse pair as a reference wavelength and averaging signals of the M-number of different optical frequencies that constitute the pulse pair according to the method described in "Appendix", a phase $\theta_i$ $(iT_N+nNT_N+2z/v)$ at a position of a distance z from the incidence end is calculated. In addition, by changing i in expression (1-3) in the first embodiment from a frequency number to a pulse pair number, a phase $\theta$ $(z, mT_N+2z/v)$ is calculated in a similar manner to the first embodiment.

The phase $\theta$ $(z, mT_N+2z/v)$ includes an angle difference between different optical frequencies in a similar manner to the description given at the beginning of the fourth embodiment. Performing correction of angle differences between different optical frequencies without omission requires performing correction of an angle difference between the optical frequencies of heads of any two pulse pairs. In the arrangement method according to the configuration method C, in one pattern, N+1-number of each of all optical frequencies become heads of pulse pairs. On the other hand, the number of pulse pairs that include optical frequencies with adjacent frequency numbers is also N+1 with respect to all frequency numbers. Therefore, the correction of angle differences between different optical frequencies can be performed without omission and without placing a disproportionate emphasis on a specific frequency number.

In particular, even when it becomes difficult to measure an optical frequency of a specific frequency number, with respect to a pulse pair of which a head is the optical frequency, a phase $\theta_i$ ($iT_N+nNT_N+2z/v$) can be calculated based on a different optical frequency and correction of an angle difference between different optical frequencies can still be performed without using the frequency.

To summarize, the configuration method C is a method that retains the advantage of the configuration method B in that, since the number of multiplexes included in one pulse pair among (N+1)-number of pulse pairs is M+1, a phase at a time point measured by the pulse pair can be calculated with high sensitivity and, at the same time, eliminates the condition requiring correction of an angle difference between different optical frequencies to be performed by inevitably using an NM+1-th optical frequency. However, there is a disadvantage in that a pattern length becomes longer than those of the methods A and B.

In an actual measurement, a most appropriate pulse configuration method is selected in consideration of a measurement object, and a signal PS corresponding to the pulse sequence is transmitted to the modulator 3 from the calculating unit 18 shown in FIG. 1 to operate the modulator 3. A signal processing method is as described earlier.

The present invention should not be limited to the embodiments described above and can be implemented by modifying components without departing from the scope of the invention.

APPENDIX

First Example

Figure 11:
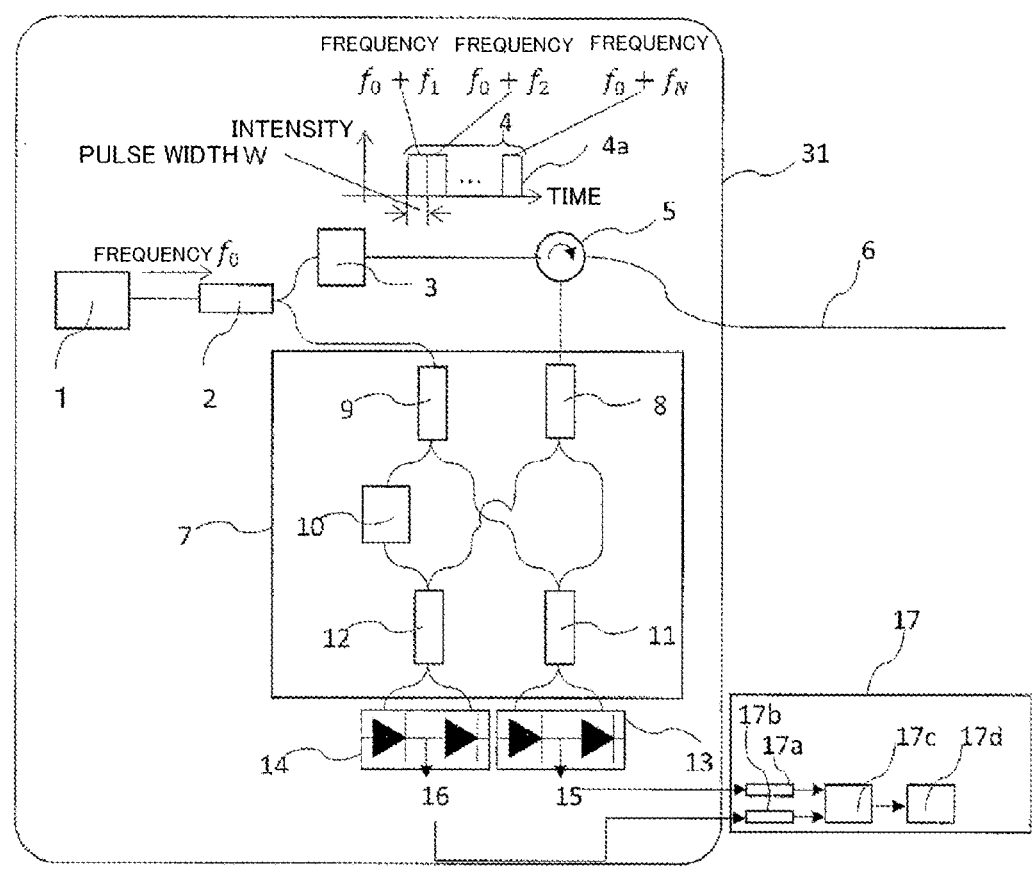
FIG. 11 is a diagram for describing a vibration detection equipment provided with a signal processing equipment related to the present invention.

FIG. 11 is a diagram for describing a vibration detection equipment that performs vibration detection using DAS-P according to the present embodiment. The present vibration detection equipment is provided with a measuring instrument 31 which uses a 90-degree optical hybrid as a receiving system to perform coherent detection and a signal processing equipment 17.

The measuring instrument 31 measures scattered light from the measured optical fiber 6 as follows. Continuous light with a single wavelength and a frequency of $f_0$ is emitted from the CW light source 1 and branched into reference light and probe light by the coupler 2. The probe light is shaped by the optical modulator 3 into an wavelength-multiplexed optical pulse such as an optical pulse 4. The optical pulse 4 is constructed by arranging i=1, 2, ..., N (where N is an integer)-number of minute pulses 4a of which a frequency is $f_0+f_i$ (where i is an integer) and of which a pulse width is set to a value W that corresponds to a spatial resolution of measurement in an optical fiber longitudinal direction. The value $f_i$ is selected such that intensities of scattered light at respective time points and respective points are sufficiently separated from each other to such an extent that the intensities can be considered uncorrelated with respect to different i.

A type of the optical modulator 3 is not specifically designated as long as the optical pulse 4 can be generated and, in some cases, the optical modulator 3 is provided in plurality. For example, an SSB modulator, a frequency-variable AO modulator, or the like may be used, or intensity modulation by SOA or the like may be further performed in order to increase an extinction ratio due to pulsation.

The optical pulse 4 is input to the measured optical fiber 6 via a circulator 5. Light scattered at each point in a longitudinal direction of the optical fiber 6 returns to the circulator 5 as back-scattered light and is input to one input unit of the 90-degree optical hybrid 7. The reference light branched by the coupler 2 is input to another input unit of the 90-degree optical hybrid 7.

The 90-degree optical hybrid 7 may be internally configured in any way as long as a function of a 90-degree optical hybrid is provided. A configuration example is shown in FIG. 11. Back-scattered light is input to a coupler 8 with a branching ratio of 50:50, and the two branched beams of scattered light are input to input units of a coupler 12 with a branching ratio of 50:50 and a coupler 11 with a branching ratio of 50:50. The reference light is input to a coupler 9 with a branching ratio of 50:50, and one of the two branched beams of the reference light is input to the input unit of the coupler 11 and the other is input to the input unit of the coupler 12 after having its phase being shifted by $\pi/2$ by a phase shifter 10.

Two outputs of the coupler 11 are detected by the balance detector 13 and an electrical signal 15 that is an analog in-phase component $I^{analog}$ is output. Two outputs of the coupler 12 are detected by the balance detector 14 and an electrical signal 16 that is an analog quadrature component $Q^{analog}$ is output.

The electrical signal 15 and the electrical signal 16 are sent to a signal processing equipment 17 provided with an AD conversion function element 17a and an AD conversion function element 17b capable of sampling a frequency range of a signal without aliasing. In the signal processing equipment 17, with respect to signals of a digitalized in-phase component $I^{digital}$ and a digitalized quadrature component $Q^{digital}$ having been output from the AD conversion function element 17a and the AD conversion function element 17b, signals due to scattered light created by pulses of the respective frequencies $f_0+f_i$ (i=1, 2, ..., N) that constitute the optical pulse 4 are separated by a signal processing unit 17c.

In other words, the signal processing unit 17c separates an in-phase component $I_i^{measure}$ and a quadrature component $Q_i^{measure}$ that are obtained when independently inputting a pulse of each frequency component $f_0+f_i$ by performing signal processing with respect to $I^{digital}$ being a superposition of in-phase components related to all i and $Q^{digital}$ being a superposition of quadrature components related to all i. As a specific signal processing method, any method may be used as long as $I_i^{measure}$ and $Q_i^{measure}$ can be accurately separated from $I^{digital}$ and $Q^{digital}$. For example, a method is conceivable in which $I_i^{measure}$ and $Q_i^{measure}$ are calculated by respectively passing $I_{digital}$ and $Q^{digital}$ through a digital bandpass filter of which a central frequency is $f_0+f_i$ and a passband is 2/W and guaranteeing a phase delay.

In addition, while separation into each frequency component is performed in the method described above after subjecting an in-phase component and a quadrature component that are in a state of an analog electrical signal to AD conversion and digitalization, AD conversion may be performed after separating an in-phase component and a quadrature component that are in a state of an analog electrical signal into each frequency component using an analog electric filter or the like.

Figure 12:
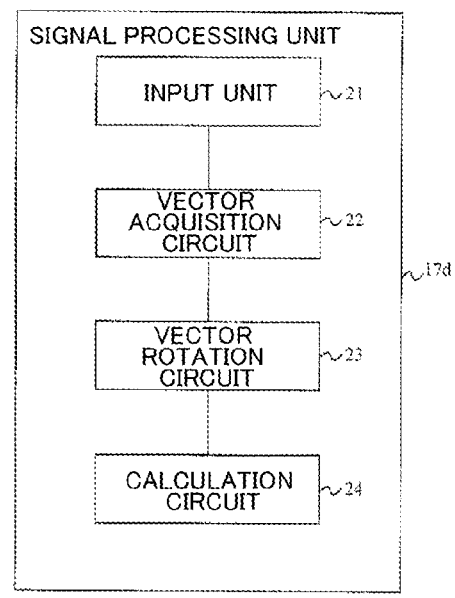
FIG. 12 is a diagram for describing a structure of the signal processing equipment related to the present invention.

Based on $I_i^{measure}$ and $Q_i^{measure}$ acquired by the signal processing unit 17c, a phase is calculated by a signal processing unit 17d. FIG. 12 is a diagram for describing a structure of the signal processing unit 17d. The signal processing unit 17d is provided with an input unit 21, a vector acquisition circuit 22, a vector rotation circuit 23, and a calculation circuit 24.

The input unit 21 receives, as inputs, an in-phase component and a quadrature component of scattered light generated by the wavelength-multiplexed optical pulse 4 having been measured by the measuring instrument 31 and input to the measured optical fiber 6.

The vector acquisition circuit 22 acquires, for each wavelength multiplexed to the optical pulse 4, a two-dimensional vector constituted by an in-phase component and a quadrature component at an arbitrary time point and an arbitrary position of the measured optical fiber 6 among the in-phase component and the quadrature component of the scattered light input to the input unit 21.

The vector rotation circuit 23 rotates the two-dimensional vector of each wavelength at a reference time point among the two-dimensional vectors acquired by the vector acquisition circuit 22 by a reference rotation amount for each wavelength so that each two-dimensional vector is oriented in the reference direction, and rotates the two-dimensional vector of each wavelength at another time point that differs from the reference time point among the two-dimensional vectors acquired by the vector acquisition circuit 22 by a reference rotation amount for each wavelength.

The calculation circuit 24 calculates a composite reference vector by averaging the two-dimensional vectors of respective wavelengths at the reference time point having been rotated by the vector rotation circuit 23, calculates a composite vector by averaging the two-dimensional vectors of respective wavelengths of the other time points having been rotated by the vector rotation circuit 23, and calculates a phase change amount of the scattered light based on an angle formed by the composite reference vector and the composite vector.

Figure 13:
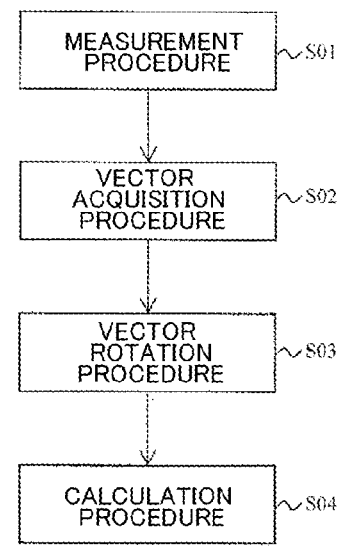
FIG. 13 is a diagram for describing a phase measurement method related to the present invention.

FIG. 13 is a diagram for describing a phase measurement method to be performed by the present vibration detection equipment. The phase measurement method performs a measurement procedure S01, a vector acquisition procedure S02, a vector rotation procedure S03, and a calculation procedure S04.

The measurement procedure S01 involves measuring an in-phase component and a quadrature component of scattered light generated by the wavelength-multiplexed optical pulse 4 input to the measured optical fiber 6.

The vector acquisition procedure S02 involves acquiring, for each wavelength multiplexed to the optical pulse 4, a two-dimensional vector constituted by an in-phase component and a quadrature component at an arbitrary time point and an arbitrary position of the measured optical fiber 6 among the in-phase component and the quadrature component of the scattered light measured in the measurement procedure S01.

The vector rotation procedure S03 involves rotating the two-dimensional vector of each wavelength at a reference time point among the two-dimensional vectors acquired in the vector acquisition procedure S02 by a reference rotation amount for each wavelength so that each two-dimensional vector is oriented in the reference direction, and rotating the two-dimensional vector of each wavelength at another time point that differs from the reference time point among the two-dimensional vectors acquired in the vector acquisition procedure S02 by a reference rotation amount for each wavelength.

The calculation procedure S04 involves calculating a composite reference vector by averaging the two-dimensional vectors of respective wavelengths at the reference time point having been rotated in the vector rotation procedure S03, calculating a composite vector by averaging the two-dimensional vectors of respective wavelengths of the other time points having been rotated in the vector rotation procedure S03, and calculating a phase change amount of the scattered light based on an angle formed by the composite reference vector and the composite vector.

First, a method of calculating a phase using an in-phase component $I_i^{measure}$ and a quadrature component $Q_i^{measure}$ having only a single frequency will be described and an effect of fading during calculation of a phase will be described.

A measured value in which noise is added to an in-phase component $I_i$ (l, nT) when there is no noise is represented by $I_i^{measure}$ (l, nT), and a measured value in which noise is added to a quadrature component $Q_i$ (l, nT) when there is no noise is represented by $Q_i^{measure}$ (l, nT). In other words, if $N_I$ and $N_Q$ denote noise respectively superimposed on the in-phase component and the quadrature component, then $N_I$ and $N_Q$ may be represented by the following expressions.

[Math. F4]

$$I_i^{measure}(l,nT)=I_i(l,nT)+N_I(l,nT) \qquad (F4)$$

[Math. F5]

$$Q_i^{measure}(l,nT)=Q_i(l,nT)+N_Q(l,nT) \qquad (F5)$$

Based on the measured in-phase component and the measured quadrature component, the signal processing equipment 17 calculates a phase as

[Math. F6]

$$\theta_i^{cal}(l, nT) = \mathrm{Arctan}\left[\frac{Q_i^{measure}(l, nT)}{I_i^{measure}(l, nT)}\right] = \mathrm{Arctan}\left[\frac{Q_i(l, nT) + N_Q(l, nT)}{I_i(l, nT) + N_I(l, nT)}\right] \quad (F6)$$

Since noises $N_I$ and $N_Q$ exist, uncertainty arises in a position indicated by a vector $$(x,y)=(I_i^{measure}(l,nT),Q_i^{measure}(l,nT))$$

on an xy plane of which an x axis represents an in-phase component and a y axis represents a quadrature component, and uncertainty also arises in a phase that is an orientation indicated by the vector. For example, when there is no noise, in a state where vibration is not applied to an optical fiber, a calculated value $\theta_i^{cal}$ (l, nT) of a phase does not vary with time and takes a constant value with respect to each l. However, when there is noise, even in a state where vibration is not applied to the optical fiber, the calculated value $\theta_i^{cal}$ (l, nT) of a phase varies with time with respect to each l.

Figure 14:
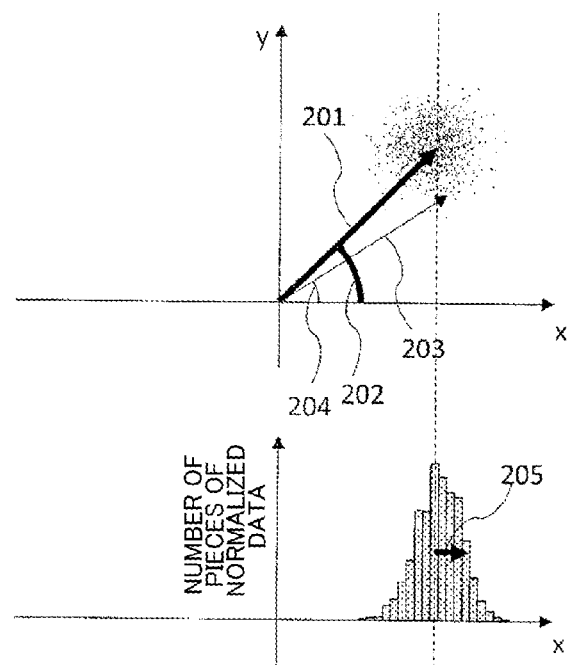
FIG. 14 is a diagram for describing an uncertainty of a position indicated by a vector due to noise.

FIG. 14 is a diagram showing this situation. When a vector $$(I_i^{measure}(l_0,nT),Q_i^{measure}(l_0,nT))$$

at a given position l0 is plotted on the xy plane. When there is no noise, the vector is kept constant at $$(x,y)=(I_i(l,nT),Q_i(l,nT))$$

as indicated by a vector 201 and an angle 202 thereof also does not vary with time. However, in reality, since noise exists, a vector constituted by the in-phase component and the quadrature component at each time point differs from the vector 201 as indicated by a vector 203 and an angle 204 thereof also differs from the angle 202. Therefore, vectors constituted by actual measured values vary while being centered on the vector 201. A degree of the variation can be evaluated using a standard deviation of measured values in each axial direction. For example, in an x-axis direction, based on a variation of an x component of the measured value, there is uncertainty corresponding to a standard deviation $\sigma(N_I)$ of the noise $N_I$ represented by reference numeral 205.

In a case of coherent detection, since intensity of reference light is sufficiently increased, shot noise becomes dominant and a distribution of noise can be approximated by a normal distribution. In addition, since intensities of light incident to two balance detectors 13 and 14 in FIG. 11 can be considered more or less the same, magnitudes of the standard deviations of noises $N_I$ and $N_Q$ can also be considered the same, and uncertainty takes a circular shape centered on the vector 201.

Even in a case of an equipment configuration in which noise other than a shot noise of reference light including thermal noise of PD and the like cannot be ignored such as when performing direct detection instead of coherent detection, since noise characteristics of the two balance detectors 13 and 14 can be considered the same, uncertainty can be considered having a circular shape centered on the vector 201.

However, in cases such as when the shot noise of scattered light must be taken into consideration in an equipment configuration in which direct detection is to be performed, while a degree of uncertainty is dependent on scattered light intensity and differs from one point to the next, since uncertainty at points where the scattered light intensity is low is dominated by noise of a measuring instrument in an electric stage and subsequent stages such as the thermal noise of PD, an effect caused by a fading phenomenon to be described below also holds true in an equipment configuration in which direct detection is to be performed.

A fading phenomenon creates points where the scattered light intensity is low. At such a point, since uncertainty at the time of phase calculation increases, it is difficult to detect small vibrations. In particular, in a case where an amplitude of scattered light where there is no noise is small as indicated by a vector 206 shown in FIG. 15 such as when an S/N ratio is lower than 1, the possibility that a measured vector assumes a value that significantly differs from the vector 206 when there is no noise as indicated by a vector 207 increases and may result in a misdetection of a vibration. In addition, at such a point, even when performing unwrapping processing represented by subsequent expression (3), the possibility that a wrong integer q is selected increases and may particularly result in a misdetection of a large vibration being applied.

A distribution D(P) of a variation of scattered light intensity P due to fading when performing an experiment with a single wavelength is known to satisfy the expression below, where an average value of the intensity of scattered light is represented by <P>.

[Math. F7]

$$D(P) \propto \exp\left[-\frac{P}{\langle P \rangle}\right] \tag{F7}$$

As indicated by the expression, the distribution D(P) of the variation of scattered light intensity P increases as the scattered light intensity P decreases. Therefore, when attempting to reduce points where scattered light intensity is low by increasing pulse intensity of a single wavelength, since an extremely high peak intensity is required, there is a limit to light intensity when pulse distortion due to a nonlinear effect or the like is taken into consideration.

In consideration thereof, as will be described below, the signal processing unit 17d performs a phase calculation using an in-phase component $I_i^{measure}$ and a quadrature component $Q_i^{measure}$ of N-number of different frequencies, where i=1, 2, . . . , N, and prevents uncertainty of a phase at points where scattered light intensity is low due to fading from increasing.

[Measurement Procedure S01]

Using the measurement system described with reference to FIG. 11, an in-phase component and a quadrature component of scattered light generated by the wavelength-multiplexed optical pulse 4 input to the measured optical fiber 6 are measured.

[Vector Acquisition Procedure S02]

For each wavelength multiplexed to the optical pulse 4, a two-dimensional vector constituted by an in-phase component and a quadrature component at an arbitrary time point and an arbitrary position of the measured optical fiber 6 among the in-phase component and the quadrature component of the scattered light measured in the measurement procedure S01 is acquired.

[Vector Rotation Procedure S03]

First, a phase $\theta_i^{cal}$ (l, 0) is calculated from a vector $(I_i^{measure}$ (l, 0), $Q_i^{measure}$(l, 0)) of a measured value at a time point zero. Next, by rotating a vector $(I_i^{measure}$ (l, nT), $Q_i^{measure}$ (l, nT)) of each time point by a rotation amount in a direction opposite to the calculated phase value $\theta_i^{cal}$ (l, 0), a new vector at each time point and each point is calculated as represented by expression (F8).

[Math. F8]

$$\begin{pmatrix} I_i^{new}(l, nT) \\ Q_i^{new}(l, nT) \end{pmatrix} = \begin{pmatrix} \cos(\theta_i^{cal}(l, 0)) & \sin(\theta_i^{cal}(l, 0)) \\ -\sin(\theta_i^{cal}(l, 0)) & \cos(\theta_i^{cal}(l, 0)) \end{pmatrix} \begin{pmatrix} I_i^{measure}(l, nT) \\ Q_i^{measure}(l, nT) \end{pmatrix} \tag{F8}$$

[Calculation Procedure S04]

Subsequently, the newly-calculated vector related to each wavelength is averaged as represented by expression (F9) to calculate a vector to be directly used in phase calculation.

[Math. F9]

$$\begin{pmatrix} I^{new}(l, nT) \\ Q^{new}(l, nT) \end{pmatrix} = \frac{1}{N} \sum_{i=1}^{N} \begin{pmatrix} I_i^{new}(l, nT) \\ Q_i^{new}(l, nT) \end{pmatrix} \tag{F9}$$

Finally, based on a vector $(I^{new}$ (l, nT), $Q^{new}$ (l, nT)), a phase $\theta^{cal}$ (l, nT) is calculated as represented by expression (F10).

[Math. F10]

$$\theta^{cal}(l, nT) = \text{Arctan}\left(\frac{Q^{new}(l, nT)}{I^{new}(l, nT)}\right) \tag{F10}$$

Calculating the phase $\theta^{cal}$ (l, nT) using the vector $(I^{new}$ (l, nT), $Q^{new}$ (l, nT)) enables points where scattered light intensity is low due to fading to be reduced. A principle thereof will be described below.

Figure 16:
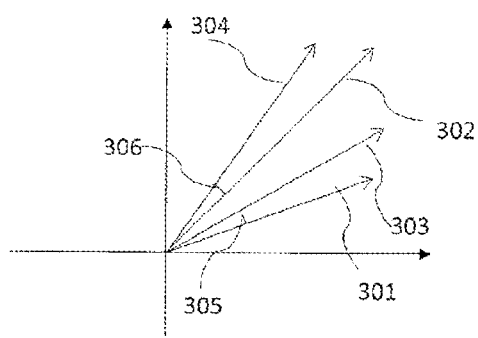
FIG. 16 is a diagram for describing a principle of the phase measurement method related to the present invention.

$\theta_i^{cal}$ (l, nT) of N-number of different frequencies, where i=1, 2, . . . , N, assumes values that differ from each other. For example, considering an example of N=2, vectors $(I_i(l, 0), Q_i$ (l, 0)) when there is no noise at the time point zero for i=1 and i=2 differ from each other in both orientation and magnitude as indicated by a vector 301 and a vector 302 in FIG. 16. When a vibration has caused a net amount of expansion/contraction of a fiber before a point at a distance l from the incidence end at a time point nT to change as compared to a time point zero, the vectors ($I_i$ (l, nT), $Q_i$ (l, nT)) at the time point nT for i=1 and i=2 respectively change as indicated by a vector 303 and a vector 304 in FIG. 16. While lengths of the vector 303 and the vector 304 have respectively changed with respect to the vector 301 and the vector 302 and an amount of change differs between i=1 and i=2, orientations of the vector 303 and the vector 304 respectively change by a same amount with respect to the vector 301 and the vector 302.

Figure 17:
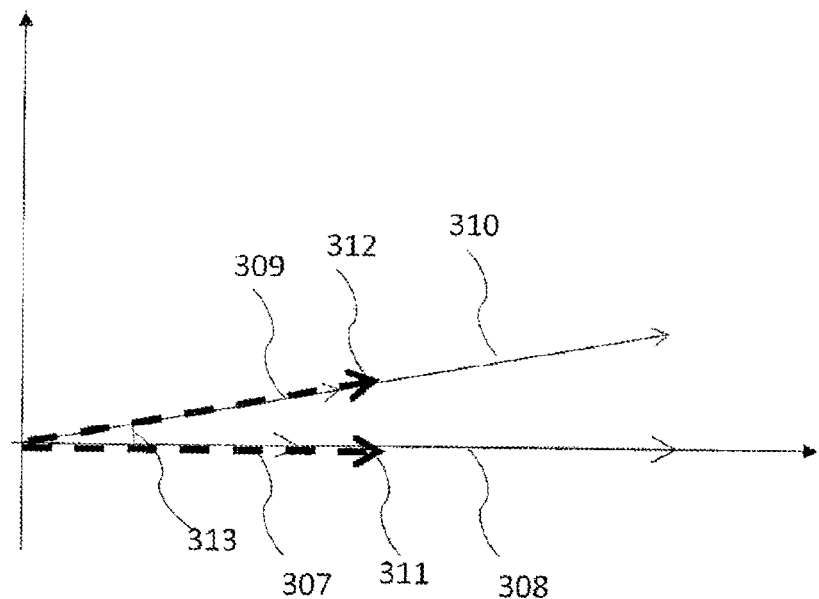
FIG. 17 is a diagram for describing the principle of the phase measurement method related to the present invention.

In other words, an angle 305 and an angle 306 are the same and an amount thereof corresponds to θ(l, nT) in expression (1). When there is no noise, according to expression (F8), the vector 301, the vector 302, the vector 303, and the vector 304 are respectively transferred to a vector 307, a vector 308, a vector 309, and a vector 310 as shown in FIG. 17. In other words, directions of vectors of all wavelengths are aligned for each time point.

($I^{new}$ (l, 0), $Q^{new}$ (l, 0)) is obtained as a vector 311 as an average of the vector 307 and the vector 308, and ($I^{new}$ (l, nT), $Q^{new}$ (l, nT)) is obtained as a vector 312 as an average of the vector 309 and the vector 310. While an amount of change of a phase between the time points 0 and nT is represented by an angle 313, the angle 313 is the same as the angle 305 and the angle 306.

In an actual measurement, uncertainty exists in orientations of the vector 301, the vector 302, the vector 303, the vector 304, the vector 311, and the vector 312 due to noise and, as a result, the angle 305 and the angle 306 are also accompanied by uncertainty. However, calculating the angle 313 using the averaged vectors 311 and 312 enable uncertainty to be reduced. This is due to two reasons.

Figure 18:
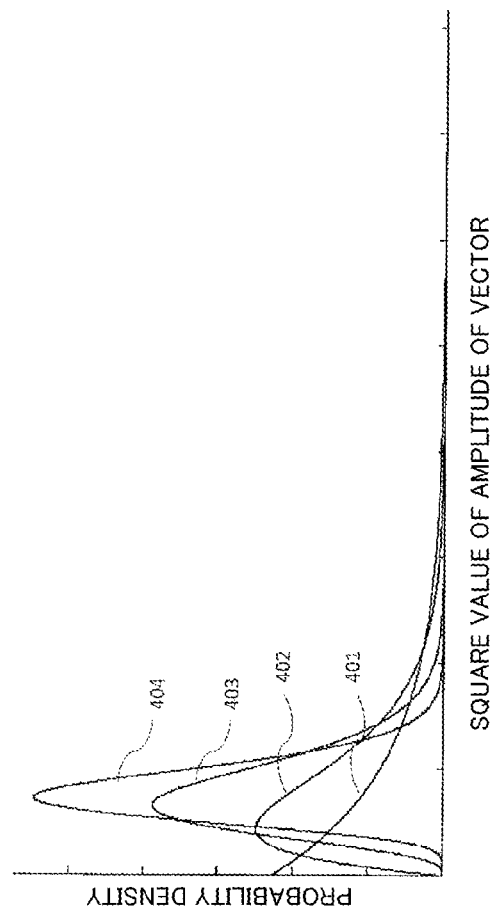
FIG. 18 is a diagram for describing an effect of the phase measurement method related to the present invention.

First, a probability distribution of intensity that corresponds to a square of amplitudes of the vector 307 and the vector 308 independently follows expression (F7). Therefore, theoretically, a probability distribution of intensity that corresponds to a square of an amplitude of the vector 311 resembles a distribution 402 shown in FIG. 18 and, even if an average value itself is the same, points where scattered light intensity is significantly lowered due to fading in a case of a single wavelength can be removed. For comparison, FIG. 18 shows a probability distribution in a case of a single wavelength as a distribution 401.

Another reason is that, with the vector 311, averaging the vectors 307 and 308 reduces a level of noise to $1/\sqrt{2}$ with respect to the vector 301 and the vector 302. Therefore, even when an average value itself of a length of the vector 311 is unchanged from the vector 301 and the vector 302, reducing the noise level enables uncertainty during phase calculation to be reduced. The same applies to the vector 312.

While an effect of the present proposal has been described in specific terms with respect to a case of frequencies when N is 2, this can be generalized. First, the larger the number of multiplexes N, the smaller the number of points where scattered light intensity approaches zero. This situation is represented by a distribution 403 in a case of N=5 and a distribution 404 in a case of N=10. In addition, since a magnitude of a noise level also becomes a multiple of $1/\sqrt{N}$, as N increases, the uncertainty during phase calculation decreases in the same average intensity.

It should be noted that the signal processing method described in the present embodiment differs from a method of simply averaging $\theta_i^{cal}$ (l, nT) with respect to different i such as a method of calculating an average of the phase 305 and the phase 306 in the case of N=2. With a method of simply averaging $\theta i^{cal}$ (l, nT) with respect to different i, since $\theta_i^{cal}$ (l, nT) itself is calculated using a single wavelength, measured values at locations where scattered light intensity is low due to fading differ significantly from a case where there is no noise. Therefore, occurrences of a misdetection of a vibration cannot be reduced. While a difference between an ideal phase value and a measured value when there is no noise can be reduced by averaging phases, a frequency of occurrences of the differences itself actually increases because points where scattered light intensity itself is reduced differ from one wavelength to the next. In other words, simply averaging $\theta_i^{cal}$ (l, nT) with respect to different i does not result in removing points where scattered light intensity is significantly lowered due to fading.

While a right side is multiplied by 1/N in expression (F9) for the sake of illustration, since the phase value calculated by expression (F10) is unchanged even when 1/N is not multiplied, actual calculations need not include multiplying by 1/N.

Second Example

In the first example, an example of a case where $\theta_i^{cal}$ (l, 0) at the time point zero is adopted as a rotation angle of vector rotation in expression (F8) has been described. The in-phase component and the quadrature component used when calculating $\theta_i^{cal}$ (l, 0) are ($I_i^{measure}$ (l, 0), $Q_i^{measure}$ (l, 0)) which represent a vector including an effect of noise. Therefore, $\theta_i^{cal}$ (l, 0) is also affected by noise. When a value of $\theta_i^{cal}$ (l, 0) and a value of $\theta_i$ (l, 0) when there is no noise at the time point zero significantly differ from each other, an effect of vector rotation according to expression (F8) may not be produced.

Figure 15:
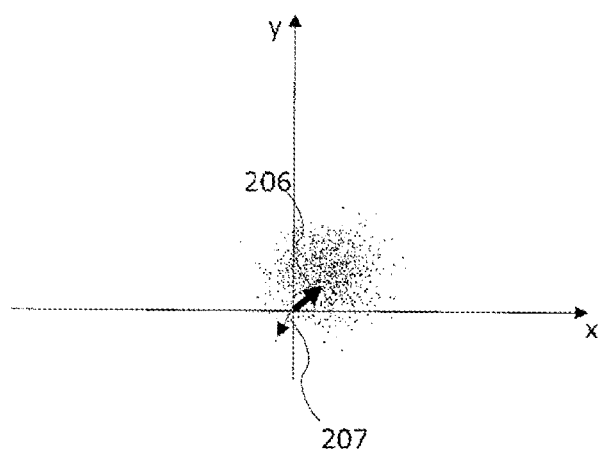
FIG. 15 is a diagram for describing a difference in vectors due to the presence or absence of noise.

A description will now be given with reference to FIG. 15. For example, let us assume that a vector of scattered light at the time point zero at a given point in a fiber longitudinal direction and at a given frequency is represented by a vector 206 when there is no noise but represented by a vector 207 when there is noise. A calculation involving rotating the vector according to expression (F8) and then averaging the vector according to expression (F9) has an effect of reducing points where a vector length approaches zero (points affected by fading). However, in the case of this example, since a rotation angle of the frequency is determined based on an angle of the vector 207, the effect cannot be obtained with respect to the frequency.

In addition, an error in the rotation angle also occurs when a magnitude of a vibration to be measured cannot be correctly evaluated. A case in point will now be described with reference to FIG. 16. For example, assuming that vectors 301 and 303 (first wavelength) and vectors 302 and 304 (second wavelength) are vectors not affected by noise, a rotation angle for causing vectors with different wavelengths to coincide with each other is not zero. However, when orientations of the vectors with the first wavelength and the vectors with the second wavelength happen to be the same due to the effect of noise at the reference time point zero, with the method according to the first embodiment, the vectors with the second wavelength are to be averaged with the vectors with the first wavelength at a rotation angle of zero or, in other words, without being rotated. In other words, a vector obtained by averaging the vector 301 and the vector 302 (unrotated) is adopted as an average vector at the time point zero and a vector obtained by averaging the vector 303 and the vector 304 (unrotated) is adopted as an average vector at the time point nT. Therefore, an angle change of the average vector from the time point zero to the time point nT no longer coincides with the angle change from the vector 303 to the vector 303 nor the angle change from the vector 302 to the vector 304 and a phase change cannot be accurately comprehended.

In the present embodiment, a method of reducing a frequency of occurrences of failures such as those presented above will be described.

Figure 19:
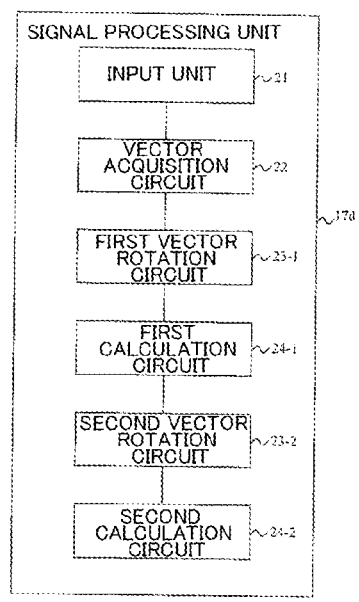
FIG. 19 is a diagram for describing a structure of the signal processing equipment related to the present invention.

FIG. 19 is a diagram for describing a structure of the signal processing unit 17d of the vibration detection equipment according to the present embodiment. The signal processing unit 17d according to the present embodiment is provided with:

an input unit 21 to which an in-phase component and a quadrature component of scattered light created by a wavelength-multiplexed optical pulse incident to a measured optical fiber having been measured by a measuring instrument are input;

a vector acquisition circuit 22 which acquires, for each wavelength multiplexed to the optical pulse, a two-dimensional vector constituted by an in-phase component and a quadrature component at an arbitrary time point and an arbitrary position of the measured optical fiber 6 among the in-phase component and the quadrature component of the scattered light input to the input unit 21;

a first vector rotation circuit 23-1 which rotates the two-dimensional vector of a reference wavelength at each time point among the two-dimensional vectors acquired by the vector acquisition circuit 22 by a reference rotation amount for each time point so that each two-dimensional vector is oriented in the reference direction and which rotates the two-dimensional vector at each time point of another wavelength that differs from the reference wavelength among the two-dimensional vectors acquired by the vector acquisition circuit 22 by a reference rotation amount for each time point;

a first calculation circuit 24-1 which calculates a first composite reference vector by averaging the two-dimensional vectors of the reference wavelength at each time point having been rotated by the first vector rotation circuit 23-1, calculates a first composite vector for each wavelength by averaging the two-dimensional vectors at each time point of the other wavelength having been rotated by the first vector rotation circuit 23-1, and calculates a reference rotation amount for each wavelength based on an angle formed by the first composite reference vector and the first composite vector;

a second vector rotation circuit 23-2 which rotates the two-dimensional vector of each wavelength at a reference time point among the two-dimensional vectors acquired by the vector acquisition circuit 22 by the reference rotation amount for each wavelength calculated by the first calculation circuit 24-1 and which rotates the two-dimensional vector of each wavelength at another time point that differs from the reference time point among the two-dimensional vectors acquired by the vector acquisition circuit 22 by the reference rotation amount for each wavelength calculated by the first calculation circuit 24-1; and a second calculation circuit 24-2 which calculates a second composite reference vector by averaging the two-dimensional vectors of respective wavelengths at the reference time point having been rotated by the second vector rotation circuit 23-2, calculates a second composite vector by averaging the two-dimensional vectors of respective wavelengths of the other time points having been rotated by the second vector rotation circuit 23-2, and calculates a phase change amount of the scattered light based on an angle formed by the second composite reference vector and the second composite vector.

Figure 20:
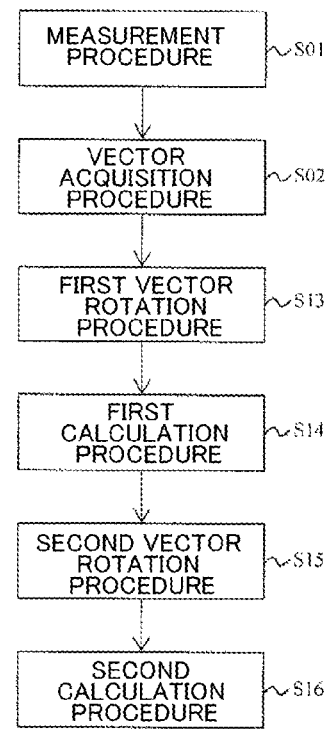
FIG. 20 is a diagram for describing the phase measurement method related to the present invention.

FIG. 20 is a diagram for describing a phase measurement method to be performed by the present vibration detection equipment. The phase measurement method includes performing:

a measurement procedure S01 for measuring an in-phase component and a quadrature component of scattered light created by a wavelength-multiplexed optical pulse incident to a measured optical fiber;

a vector acquisition procedure S02 for acquiring, for each wavelength multiplexed to the optical pulse, a two-dimensional vector constituted by an in-phase component and a quadrature component at an arbitrary time point and an arbitrary position of the measured optical fiber among the in-phase component and the quadrature component of the scattered light measured in the measurement procedure S01;

a first vector rotation procedure S13 for rotating the two-dimensional vector of a reference wavelength at each time point among the two-dimensional vectors acquired in the vector acquisition procedure S02 by a reference rotation amount for each time point so that each two-dimensional vector is oriented in the reference direction and rotating the two-dimensional vector at each time point of another wavelength that differs from the reference wavelength among the two-dimensional vectors acquired in the vector acquisition procedure S02 by a reference rotation amount for each time point;

a first calculation procedure S14 for calculating a first composite reference vector by averaging the two-dimensional vectors of the reference wavelength at each time point having been rotated in the first vector rotation procedure S13, calculating a first composite vector for each wavelength by averaging the two-dimensional vectors at each time point of the other wavelength having been rotated in the first vector rotation procedure S13, and calculating a reference rotation amount for each wavelength based on an angle formed by the first composite reference vector and the first composite vector;

a second vector rotation procedure S15 for rotating the two-dimensional vector of each wavelength at a reference time point among the two-dimensional vectors acquired in the vector acquisition procedure S02 by the reference rotation amount for each wavelength calculated in the first calculation procedure S14 and rotating the two-dimensional vector of each wavelength at another time point that differs from the reference time point among the two-dimensional vectors acquired in the vector acquisition procedure S02 by the reference rotation amount for each wavelength calculated in the first calculation procedure S14; and a second calculation procedure S16 for calculating a second composite reference vector by averaging the two-dimensional vectors of respective wavelengths at the reference time point having been rotated in the second vector rotation procedure S15, calculating a second composite vector by averaging the two-dimensional vectors of respective wavelengths of the other time points having been rotated in the second vector rotation procedure S15, and calculating a phase change amount of the scattered light based on an angle formed by the second composite reference vector and the second composite vector.

The input unit 21, the vector acquisition circuit 22, the measurement procedure S01, and the vector acquisition procedure S02 are the same as in the description of the first embodiment.

First, the first vector rotation circuit 23-1 performs the following first vector rotation procedure S13.

With i=1 as a reference (reference wavelength), the following expression is calculated for all i.

[Math. F11]

$$r'_i(l, nT) = \begin{pmatrix} I'_i(l, nT) \\ Q'_i(l, nT) \end{pmatrix} = \begin{pmatrix} \cos(\theta_1^{cal}(l, nT)) & \sin(\theta_1^{cal}(l, nT)) \\ -\sin(\theta_1^{cal}(l, nT)) & \cos(\theta_1^{cal}(l, nT)) \end{pmatrix} \begin{pmatrix} I_i^{measure}(l, nT) \\ Q_i^{measure}(l, nT) \end{pmatrix} \quad (F11)$$

Next, the first calculation circuit 23-1 performs the following first calculation procedure S14.

An average is calculated using the following expression with respect to all time points of r' (l, nT) acquired by expression (F11).

[Math. F12]

$$r''_i(l) = \begin{pmatrix} I''_i(l) \\ Q''_i(l) \end{pmatrix} = \frac{1}{M} \sum_{n=1}^{M} r'_i(l, nT) \quad (F12)$$

where M represents the number of samples in a time point direction. Using $r_i''(l)$ obtained by expression (F12), the following expression is calculated.

[Math. F13]

$$\theta'_i(l) = \text{Arctan}\left[\frac{Q''_i(l)}{I''_i(l)}\right] \quad (F13)$$

A description in simple terms is as follows.

First, with respect to a reference wavelength i=1, a vector at each time point is rotated so as to face an I axis. Let this rotation angle be represented by $\theta_{i=1}(t)$. $\theta_{i=1}(t)$ varies with time. In addition, let the vector after the rotation be represented by At.

Next, with respect to other wavelengths, a vector at each time point is rotated by $\theta_{i=1}(t)$. Let the vector after the rotation for each wavelength be represented by $Bt_i$.

Subsequently, vectors after the rotation are averaged over time for each wavelength. Let the vector after the time average with respect to the reference wavelength be represented by ΣAt. Let the vector after the time average with respect to the other wavelengths be represented by $\Sigma Bt_i$.

In addition, an angle formed by ΣAt and $\Sigma Bt_i$ is obtained. This angle corresponds to $\theta'_i$ (l) in expression (F13). $\theta'_i$ (l) exists for each of the other wavelengths.

The second vector rotation procedure S15 that is performed by the second vector rotation circuit 23-2 and the second calculation procedure S16 that is performed by the second calculation circuit 24-2 are respectively the same as the vector rotation procedure S03 and the calculation procedure S04 described in the first embodiment with the exception of the following points. When calculating expression (F8), $\theta'_i$' (l) in expression (F13) is used in place of $\theta_i^{cal}$ (l, 0) to calculate a vector ($I^{new}$ (l, nT), $Q^{new}$ (l, nT)), and a phase is calculated according to expression (F9).

A significance of the present method will now be described. Even when a vibration occurs, an angle formed between vectors with respectively different frequencies does not change when there is no noise. For example, when considering a case of two frequencies as an example, an angle formed between a vector 301 and a vector 302 at a reference time point and an angle formed between a vector 303 and a vector 304 after a time nT are the same if not affected by noise. In consideration thereof, after rotating vectors according to expression (F11), averaging of the vectors is performed using expression (F12) and an angle formed between an averaged vector at the reference time point and an averaged vector after a time nT is adopted as $\theta_i'$ (l). Accordingly, a magnitude of noise accompanying each vector can be reduced to $1/\sqrt{M}$. Therefore, an effect of noise can be reduced by setting a sufficiently large M.

It should be noted that the method according to the present embodiment differs from a method (hereinafter, described as a comparative method) in which, after obtaining a phase difference between vectors with different frequencies for each time point, a rotation angle is obtained by averaging the phase differences with respect to all time points. The method according to the present embodiment differs in that vectors of all wavelengths are rotated in advance by a rotation angle of a first wavelength. For example, when there are two frequencies, the comparative method simply involves calculating an angle difference between the vector 302 and the vector 301 and an angle difference between the vector 303 and the vector 302 and obtaining a rotation angle as an average value of the angle difference. In the comparative method, since an occurrence probability of points where a calculated value of the phase difference at each time point differs significantly from a case where there is no noise (measurement positions of a measured optical fiber) is unchanged, an effect of a rotation according to expression (F8) is insufficient.

While a right side is multiplied by 1/M in expression (F12) for the sake of illustration, since the rotation angle calculated by expression (F13) is unchanged even when 1/M is not multiplied, actual calculations need not include multiplying by 1/M.

While the method according to the second example increases calculation time as compared to the method according to the first example, uncertainty in a final phase calculation can be reduced as compared to the first example.

REFERENCE SIGNS LIST

1 Light source
2 Coupler
3 Optical modulator
4 Optical pulse
4a Minute pulse
5 Circulator
6 Measured optical fiber
7 90-degree optical hybrid
8, 9 Coupler
10 Phase shifter
11, 12 Coupler
13, 14 Balance detector
15 Electrical signal of analog in-phase component
16 Electrical signal of analog quadrature component
17 Signal processing equipment 17a, 17b AD conversion element
17c, 17d Signal processing unit
18 Calculating unit
21 Input unit
22 Vector acquisition circuit
23 Vector rotation circuit
24 Calculation circuit
23-1 First vector rotation circuit
23-2 Second vector rotation circuit
24-1 First calculation circuit
24-2 Second calculation circuit
31 Measuring instrument

The invention claimed is:

1. An optical pulse test method comprising:
inputting an optical pulse sequence of which the number of wavelength multiplexes is N and in which optical pulses with different optical frequencies are arranged at temporally regular intervals to one end of a measured optical fiber;
receiving scattered light of each wavelength having returned to the one end of the measured optical fiber;
observing a vibration of the measured optical fiber as a time variation of a phase component of the scattered light; and
determining the number of wavelength multiplexes N as a minimum value satisfying Math. C1 as follows

[Math. C1]

When $F_v(t) < \pi$ $$N \geq \frac{4Zf_v^{max}}{v}$$

when $F_v(t) \geq \pi$ $$N > \frac{2Z}{vC_{max}^{-1}(\pi)}$$

(C1)

where
t represents time,
Z represents a length of the measured optical fiber (measurement distance),
v represents the speed of light inside the measured optical fiber,
$F_v(t)$ represents a time waveform of a phase change in an arbitrary section of the measured optical fiber,
$\tilde{F}_v(f_v)$ represents a function obtained by a Fourier transform of $F_v(t)$,
$f_v^{max}$ represents a maximum value of a frequency range occupied by $\tilde{F}_v(f_v)$,
C(t) represents an absolute value of a phase change between a time point t and a time point $t+T_N$,
$C_{max}(T_N)$ represents a maximum value of C(t) when arbitrarily changing the time point t,
$C_{max}^{-1}(F_v)$ represents an inverse function of $C_{max}(T_N)$,
$F_v$ represents a difference between a maximum value and a minimum value of $F_v(t)$,
$T_N$ represents intervals of optical pulses in the optical pulse sequence, and
$C_{max}^{-1}(\Pi)$ represents the intervals $T_N$ of the optical pulses when an absolute value of a magnitude of phase change is $\Pi$.

2. The optical pulse test method according to claim 1, comprising:
forming the optical pulse by arranging M-number of minute optical pulses with different optical frequencies at shorter intervals than optical pulse intervals of the optical pulse sequence; and
setting the number M of the minute optical pulses so that $1/\sqrt{M}$ times a noise level is equal to or lower than a predetermined value.

3. The optical pulse test method according to claim 2, comprising:
inputting, before inputting the optical pulse sequence to the one end of the measured optical fiber, a correction optical pulse sequence in which optical pulse pairs in which optical pulses with different optical frequencies are arranged at shorter intervals than optical pulse intervals of the optical pulse sequence are arranged to the one end of the measured optical fiber; and
calculating a correction value of the phase component of the scattered light by Math. C2,

[Math. C2]

$$\phi(i(m'), i(m)) = \arg\left[\frac{1}{P}\sum_{p=1}^{P} R[\arg\{r_{i(m)}(z, t_p + 2z/v)\}]r_{i(m')}(z, t_p + 2z/v)\right]$$ (C2)

where $\Phi(i(m'), i(m))$ represents an angle difference between two of the optical pulses with different optical frequencies,
P represents the number of the optical pulse pairs included in the correction optical pulse sequence,
p represents a number (an integer from 1 to P) of the optical pulse pair,
$t_p$ represents a time at which the p-th optical pulse pair is input to the one end of the measured optical fiber,
z represents a distance from the one end of the measured optical fiber,
$r_{i(m)}(z, t_p+2z/v)$ and $r_{i(m')}(z, t_p+2z/v)$ represent complex vectors of scattered light from the distance z,
an arg function represents a function which calculates a deflection angle of a complex vector of an argument within a range from $-\pi$ to $\pi$ and which outputs a real number, and
R(*) represents an operator which rotates a complex vector r clockwise by an angle * on a complex plane.

4. The optical pulse test method according to claim 1, comprising:
inputting, before inputting the optical pulse sequence to the one end of the measured optical fiber, a correction optical pulse sequence in which optical pulse pairs in which optical pulses with different optical frequencies are arranged at shorter intervals than optical pulse intervals of the optical pulse sequence are arranged to the one end of the measured optical fiber; and
calculating a correction value of the phase component of the scattered light by Math. C2,

[Math. C2]

$$\phi(i(m'), i(m)) = \arg\left[\frac{1}{P}\sum_{p=1}^{P} R[\arg\{r_{i(m)}(z, t_p + 2z/v)\}]r_{i(m')}(z, t_p + 2z/v)\right]$$ (C2)

where $\Phi(i(m'), i(m))$ represents an angle difference between two of the optical pulses with different optical frequencies,
P represents the number of the optical pulse pairs included in the correction optical pulse sequence, p represents a number (an integer from 1 to P) of the optical pulse pair, $t_p$ represents a time at which the p-th optical pulse pair is input to the one end of the measured optical fiber, z represents a distance from the one end of the measured optical fiber, $r_{i(m)}$ (z, $t_p$+2z/v) and $r_{i(m')}$ (z, $t_p$+2z/v) represent complex vectors of scattered light from the distance z, an arg function represents a function which calculates a deflection angle of a complex vector of an argument within a range from −π to π and which outputs a real number, and R(*) represents an operator which rotates a complex vector r clockwise by an angle * on a complex plane.

5. An optical pulse test method comprising:

forming M-number of groups in which N×M+1-number (where N and M are natural numbers) of minute optical pulses with different optical frequencies are arranged;

arranging the M-number of groups and segmenting M-numbers of the minute optical pulses from the top group of the groups to form N×M+1-number of optical pulse pairs;

inputting an optical pulse sequence in which the N×M+1-number of optical pulse pairs are arranged at temporally regular intervals to one end of a measured optical fiber;

receiving scattered light of each wavelength having returned to the one end of the measured optical fiber;

observing a vibration of the measured optical fiber as a time variation of a phase component of the scattered light;

determining the number of wavelength multiplexes N as a minimum value satisfying Math. C1; and setting the number of wavelength multiplexes M so that 1/√M times a noise level is equal to or lower than a predetermined value where Math. C1 is as follows

[Math. C1]

When $F_v(t) < \pi$ (C1)

$$N \geq \frac{4Zf_v^{max}}{v}$$

when $F_v(t) \geq \pi$ $$N > \frac{2Z}{vC_{max}^{-1}(\pi)}$$

where t represents time,

Z represents a length of the measured optical fiber (measurement distance), v represents the speed of light inside the measured optical fiber, $F_v(t)$ represents a time waveform of a phase change in an arbitrary section of the measured optical fiber, $\tilde{F}_v(f_v)$ represents a function obtained by a Fourier transform of $F_v(t)$, $f_v^{max}$ represents a maximum value of a frequency range occupied by $\tilde{F}_v(f_v)$, C(t) represents an absolute value of a phase change between a time point t and a time point t+$T_N$, $C_{max}(T_N)$ represents a maximum value of C(t) when arbitrarily changing the time point t, $C_{max}^{-1}(F_v)$ represents an inverse function of $C_{max}(T_N)$, $F_v$ represents a difference between a maximum value and a minimum value of $F_v(t)$, $T_N$ represents intervals of optical pulses in the optical pulse sequence, and $C_{max}^{-1}(\Pi)$ represents the intervals $T_N$ of the optical pulses when an absolute value of a magnitude of phase change is Π.

6. The optical pulse test method according to claim 5, comprising:

inputting, before inputting the optical pulse sequence to the one end of the measured optical fiber, a correction optical pulse sequence in which optical pulse pairs in which optical pulses with different optical frequencies are arranged at shorter intervals than optical pulse intervals of the optical pulse sequence are arranged to the one end of the measured optical fiber; and calculating a correction value of the phase component of the scattered light by Math. C2,

[Math. C2]

$$\phi(i(m'), i(m)) = \arg\left[\frac{1}{P}\sum_{p=1}^{P} R[\arg\{r_{i(m)}(z, t_p + 2z/v)\}]r_{i(m')}(z, t_p + 2z/v)\right] \quad (C2)$$

where Φ(i(m'), i(m)) represents an angle difference between two of the optical pulses with different optical frequencies, P represents the number of the optical pulse pairs included in the correction optical pulse sequence, p represents a number (an integer from 1 to P) of the optical pulse pair, $t_p$ represents a time at which the p-th optical pulse pair is input to the one end of the measured optical fiber, z represents a distance from the one end of the measured optical fiber, $r_{i(m)}$ (z, $t_p$+2z/v) and $r_{i(m')}$ (z, $t_p$+2z/v) represent complex vectors of scattered light from the distance z, an arg function represents a function which calculates a deflection angle of a complex vector of an argument within a range from −π to π and which outputs a real number, and R(*) represents an operator which rotates a complex vector r clockwise by an angle * on a complex plane.

7. An optical pulse test method comprising:

forming N+1-number of groups in which N×M-number (where N and M are natural numbers) of minute optical pulses with different optical frequencies are arranged;

arranging the N+1-number of groups and segmenting M-numbers of the minute optical pulses from the top group of the groups to form N(N+1)-number of optical pulse pairs;

adding an additional minute optical pulse of which an optical frequency differs from the optical frequency of any of the minute optical pulses to each N+1-number of optical pulse pairs among the N(N+1)-number of optical pulse pairs;

inputting an optical pulse sequence in which the N(N+1) number of optical pulse pairs including the optical pulse pairs to which the additional minute optical pulse has been added are arranged at temporally regular intervals to one end of a measured optical fiber;

receiving scattered light of each wavelength having returned to the one end of the measured optical fiber;

observing a vibration of the measured optical fiber as a time variation of a phase component of the scattered light;

determining the number of wavelength multiplexes N as a minimum value satisfying Math. C1; and setting the number of wavelength multiplexes M so that $1/\sqrt{M}$ times a noise level is equal to or lower than a predetermined value where C1 is as follows

[Math. C1]

When $F_v(t) < \pi$ (C1)

$$N \geq \frac{4Zf_v^{max}}{v}$$

when $F_v(t) \geq \pi$ $$N > \frac{2Z}{vC_{max}^{-1}(\pi)}$$

where t represents time,

Z represents a length of the measured optical fiber (measurement distance), v represents the speed of light inside the measured optical fiber, $F_v(t)$ represents a time waveform of a phase change in an arbitrary section of the measured optical fiber, $\tilde{F}_v(f_v)$ represents a function obtained by a Fourier transform of $F_v(t)$, $f_v^{max}$ represents a maximum value of a frequency range occupied by $\tilde{F}_v(f_v)$, C(t) represents an absolute value of a phase change between a time point t and a time point $t+T_N$, $C_{max}(T_N)$ represents a maximum value of C(t) when arbitrarily changing the time point t, $C_{max}^{-1}(F_v)$ represents an inverse function of $C_{max}(T_N)$, $F_v$ represents a difference between a maximum value and a minimum value of $F_v(t)$, $T_N$ represents intervals of optical pulses in the optical pulse sequence, and $C_{max}^{-1}(\Pi)$ represents the intervals $T_N$ of the optical pulses when an absolute value of a magnitude of phase change is $\Pi$.

8. The optical pulse test method according to claim 7, comprising:

inputting, before inputting the optical pulse sequence to the one end of the measured optical fiber, a correction optical pulse sequence in which optical pulse pairs in which optical pulses with different optical frequencies are arranged at shorter intervals than optical pulse intervals of the optical pulse sequence are arranged to the one end of the measured optical fiber; and calculating a correction value of the phase component of the scattered light by Math. C2,

[Math. C2]

$$\phi(i(m'), i(m)) = \arg\left[\frac{1}{P}\sum_{p=1}^{P} R[\arg\{r_{i(m)}(z, t_p + 2z/v)\}]r_{i(m')}(z, t_p + 2z/v)\right]$$ (C2)

where $\Phi(i(m'), i(m))$ represents an angle difference between two of the optical pulses with different optical frequencies, P represents the number of the optical pulse pairs included in the correction optical pulse sequence, p represents a number (an integer from 1 to P) of the optical pulse pair, $t_p$ represents a time at which the p-th optical pulse pair is input to the one end of the measured optical fiber, z represents a distance from the one end of the measured optical fiber, $r_{i(m)}(z, t_p+2z/v)$ and $r_{i(m')}(z, t_p+2z/v)$ represent complex vectors of scattered light from the distance z, an arg function represents a function which calculates a deflection angle of a complex vector of an argument within a range from $-\pi$ to $\pi$ and which outputs a real number, and R(*) represents an operator which rotates a complex vector r clockwise by an angle * on a complex plane.

9. An optical pulse test method comprising:

forming (N+1)M+1-number of groups in which N×M+1-number (where N and M are natural numbers) of minute optical pulses with different optical frequencies are arranged;

arranging the (N+1)M+1-numbers of groups and segmenting the minute optical pulses from the top group of the groups so that M+1-number of the minute optical pulses are included in a 1+k(N+1)-th optical pulse pair and M-number of the minute optical pulses are included in the other pulse pairs to form (N×M+1)(N+1)-number of the optical pulse pairs;

inputting an optical pulse sequence in which the (N×M+1)(N+1)-number of optical pulse pairs are arranged at temporally regular intervals to one end of a measured optical fiber;

receiving scattered light of each wavelength having returned to the one end of the measured optical fiber;

observing a vibration of the measured optical fiber as a time variation of a phase component of the scattered light;

determining the number of wavelength multiplexes N as a minimum value satisfying Math. C1; and setting the number of wavelength multiplexes M so that $1/\sqrt{M}$ times a noise level is equal to or lower than a predetermined value where Math. C1 is as follows

[Math. C1]

When $F_v(t) < \pi$ (C1)

$$N \geq \frac{4Zf_v^{max}}{v}$$

when $F_v(t) \geq \pi$ $$N > \frac{2Z}{vC_{max}^{-1}(\pi)}$$

where t represents time,

Z represents a length of the measured optical fiber (measurement distance), v represents the speed of light inside the measured optical fiber, $F_v(t)$ represents a time waveform of a phase change in an arbitrary section of the measured optical fiber, $\tilde{F}_v(f_v)$ represents a function obtained by a Fourier transform of $F_v(t)$, $f_v^{max}$ represents a maximum value of a frequency range occupied by $\tilde{F}_v(f_v)$, C(t) represents an absolute value of a phase change between a time point t and a time point $t+T_N$, $C_{max}(T_N)$ represents a maximum value of C(t) when arbitrarily changing the time point t, $C_{max}^{-1}(F_v)$ represents an inverse function of $C_{max}(T_N)$, $F_v$ represents a difference between a maximum value and a minimum value of $F_v(t)$, $T_N$ represents intervals of optical pulses in the optical pulse sequence, and $C_{max}^{-1}(\Pi)$ represents the intervals $T_N$ of the optical pulses when an absolute value of a magnitude of phase change is $\Pi$.

10. The optical pulse test method according to claim 9, comprising:

inputting, before inputting the optical pulse sequence to the one end of the measured optical fiber, a correction optical pulse sequence in which optical pulse pairs in which optical pulses with different optical frequencies are arranged at shorter intervals than optical pulse intervals of the optical pulse sequence are arranged to the one end of the measured optical fiber; and calculating a correction value of the phase component of the scattered light by Math. C2,

[Math. C2]

$$\phi(i(m'), i(m)) = \arg\left[\frac{1}{P}\sum_{p=1}^{P} R[\arg\{r_{i(m)}(z, t_p + 2z/v)\}]r_{i(m')}(z, t_p + 2z/v)\right] \quad (C2)$$

where $\Phi(i(m'), i(m))$ represents an angle difference between two of the optical pulses with different optical frequencies, P represents the number of the optical pulse pairs included in the correction optical pulse sequence, p represents a number (an integer from 1 to P) of the optical pulse pair, $t_p$ represents a time at which the p-th optical pulse pair is input to the one end of the measured optical fiber, z represents a distance from the one end of the measured optical fiber, $r_{i(m)}(z, t_p+2z/v)$ and $r_{i(m')}(z, t_p+2z/v)$ represent complex vectors of scattered light from the distance z, an arg function represents a function which calculates a deflection angle of a complex vector of an argument within a range from $-\pi$ to $\pi$ and which outputs a real number, and R(*) represents an operator which rotates a complex vector r clockwise by an angle * on a complex plane.

11. An optical pulse test equipment, comprising:

a light source which inputs an optical pulse sequence of which the number of wavelength multiplexes is N and in which optical pulses with different optical frequencies are arranged at temporally regular intervals to one end of a measured optical fiber;

an optical receiver which receives scattered light of each wavelength having returned to the one end of the measured optical fiber;

a signal processing unit which observes a vibration of the measured optical fiber as a time variation of a phase component of the scattered light; and a calculating unit which determines the number of wavelength multiplexes N as a minimum value satisfying Math. C1 as follows

[Math. C1]

When $F_v(t) < \pi$ $$N \geq \frac{4Zf_v^{max}}{v} \quad (C1)$$

when $F_v(t) \geq \pi$ $$N > \frac{2Z}{vC_{max}^{-1}(\pi)}$$

where t represents time,

Z represents a length of the measured optical fiber (measurement distance), v represents the speed of light inside the measured optical fiber, $F_v(t)$ represents a time waveform of a phase change in an arbitrary section of the measured optical fiber, $\tilde{F}_v(f_v)$ represents a function obtained by a Fourier transform of $F_v(t)$, $f_v^{max}$ represents a maximum value of a frequency range occupied by $\tilde{F}_v(f_v)$, C(t) represents an absolute value of a phase change between a time point t and a time point $t+T_N$, $C_{max}(T_N)$ represents a maximum value of C(t) when arbitrarily changing the time point t, $C_{max}^{-1}(F_v)$ represents an inverse function of $C_{max}(T_N)$, $F_v$ represents a difference between a maximum value and a minimum value of $F_v(t)$, $T_N$ represents intervals of optical pulses in the optical pulse sequence, and $C_{max}^{-1}(\Pi)$ represents the intervals $T_N$ of the optical pulses when an absolute value of a magnitude of phase change is $\Pi$.

12. The optical pulse test equipment according to claim 11, wherein:

the light source inputs, before inputting the optical pulse sequence to the one end of the measured optical fiber, a correction optical pulse sequence in which optical pulse pairs in which optical pulses with different optical frequencies are arranged at shorter intervals than optical pulse intervals of the optical pulse sequence are arranged to the one end of the measured optical fiber; and the signal processing unit calculates a correction value of the phase component of the scattered light by Math. C2,

[Math. C2]

$$\phi(i(m'), i(m)) = \arg\left[\frac{1}{P}\sum_{p=1}^{P} R[\arg\{r_{i(m)}(z, t_p + 2z/v)\}]r_{i(m')}(z, t_p + 2z/v)\right] \quad (C2)$$

where $\Phi(i(m'), i(m))$ represents an angle difference between two of the optical pulses with different optical frequencies, P represents the number of the optical pulse pairs included in the correction optical pulse sequence, p represents a number (an integer from 1 to P) of the optical pulse pair, $t_p$ represents a time at which the p-th optical pulse pair is input to the one end of the measured optical fiber, z represents a distance from the one end of the measured optical fiber, $r_{i(m)}(z, t_p+2z/v)$ and $r_{i(m')}(z, t_p+2z/v)$ represent complex vectors of scattered light from the distance z, an arg function represents a function which calculates a deflection angle of a complex vector of an argument within a range from $-\pi$ to $\pi$ and which outputs a real number, and R(*) represents an operator which rotates a complex vector r clockwise by an angle * on a complex plane.

* * * * *